(12) United States Patent
Baron et al.

(10) Patent No.: US 10,980,060 B2
(45) Date of Patent: Apr. 13, 2021

(54) TRIGGER FRAMES ADAPTED TO PACKET-BASED POLICIES IN AN 802.11 NETWORK

(71) Applicant: CANON KABUSHIKI KAISHA, Tokyo (JP)

(72) Inventors: Stéphane Baron, Le Rheu (FR); Romain Guignard, Rennes (FR); Pascal Viger, Janze (FR); Patrice Nezou, Saint Sulpice la Foret (FR)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 15/743,226

(22) PCT Filed: Jul. 8, 2016

(86) PCT No.: PCT/EP2016/066232
§ 371 (c)(1),
(2) Date: Jan. 9, 2018

(87) PCT Pub. No.: WO2017/009209
PCT Pub. Date: Jan. 19, 2017

(65) Prior Publication Data
US 2018/0213566 A1 Jul. 26, 2018

(30) Foreign Application Priority Data
Jul. 10, 2015 (GB) .................................... 1512130

(51) Int. Cl.
*H04W 74/08* (2009.01)
*H04W 72/12* (2009.01)
(Continued)

(52) U.S. Cl.
CPC ... *H04W 74/0816* (2013.01); *H04W 72/1242* (2013.01); *H04W 84/12* (2013.01)

(58) Field of Classification Search
CPC ......... H04W 74/0816; H04W 72/1242; H04W 84/12; H04W 74/08; H04W 74/085; H04W 74/06; H04W 28/26
See application file for complete search history.

(56) References Cited

U.S. PATENT DOCUMENTS

2013/0336184 A1* 12/2013 Kwon ................. H04W 72/005
370/311
2015/0003435 A1* 1/2015 Horn ..................... H04W 28/24
370/338

(Continued)

FOREIGN PATENT DOCUMENTS

CN 102769925 A 11/2012
JP 2016213760 A 12/2016
(Continued)

OTHER PUBLICATIONS

Ryu et al., UL MU Procedure, Mar. 9, 2015, IEEE 802.11-15/0365r0 (Year: 2015).*

(Continued)

*Primary Examiner* — Shailendra Kumar
(74) *Attorney, Agent, or Firm* — Canon U.S.A., Inc. IP Division

(57) ABSTRACT

In 802.11ax networks with access points, a trigger frame offers scheduled and random resource units to nodes for data uplink communication to the access points. To make more effective the usage of the network, the access point may design the trigger frame to force the nodes to send some categories of data. Resource units may be defined in trigger frames to be dedicated to small packets or to some access category data. Adjusting the time length of the resource units helps restricting the type of data that can be conveyed by the resource units. Also, using various frequency widths for resource units in the same trigger frame helps reducing (Continued)

padding in the resource units when various traffic types coexist.

12 Claims, 12 Drawing Sheets

(51) Int. Cl.
*H04W 84/12* (2009.01)
*H04W 74/06* (2009.01)
*H04W 28/26* (2009.01)

(56) References Cited

U.S. PATENT DOCUMENTS

| | | | |
|---|---|---|---|
| 2015/0146654 A1* | 5/2015 | Chu | H04L 5/0055 370/329 |
| 2015/0257168 A1* | 9/2015 | Lu | H04W 28/0268 370/329 |
| 2016/0242195 A1 | 8/2016 | Kwon | |

FOREIGN PATENT DOCUMENTS

| | | |
|---|---|---|
| KR | 20150051911 A | 5/2015 |
| RU | 2416177 C2 | 4/2011 |
| WO | 2010/107165 A1 | 9/2010 |
| WO | 2015/076855 A1 | 5/2015 |
| WO | 2015/081179 A1 | 6/2015 |
| WO | 2016/140519 A1 | 9/2016 |

OTHER PUBLICATIONS

KIPO's Notice of Preliminary Rejection; Korean Patent Application No. 10-2018-7003316, pp. 1-5.

Kiseon Ryu, et al., UL MU Procedure, 11-15-0365-00-00ax-ul-mu-procedure, IEEE Draft; 11-15-0365-00-00AX-UI-MU-Procedure, IEEE-SA Mentor, Mar. 9, 2015, pp. 1-16, vol. 802.11ax, Piscataway, NJ USA, XP068083020, [retrieved on Mar. 9, 2015].

Weiping Sun, et al., IEEE 802.11ah: A Long Range 802.11 WLAN at Sub 1 GHz, Journal of ICT Standardization, 2013, pp. 83-107, vol. 1, River Publishers.

Adachi, et al., Regarding Trigger Frame in UL MU, found in JP 2017-566804, doc: IEEE 802.11-15/0608rl, May 2015.

Chunhui Zhu, LB 188 Comments Resolutions for Sub-Clause 9.19, found in JP 2017-566804, doc: IEEE 802.11-12/0994r4, Sep. 2012.

\* cited by examiner

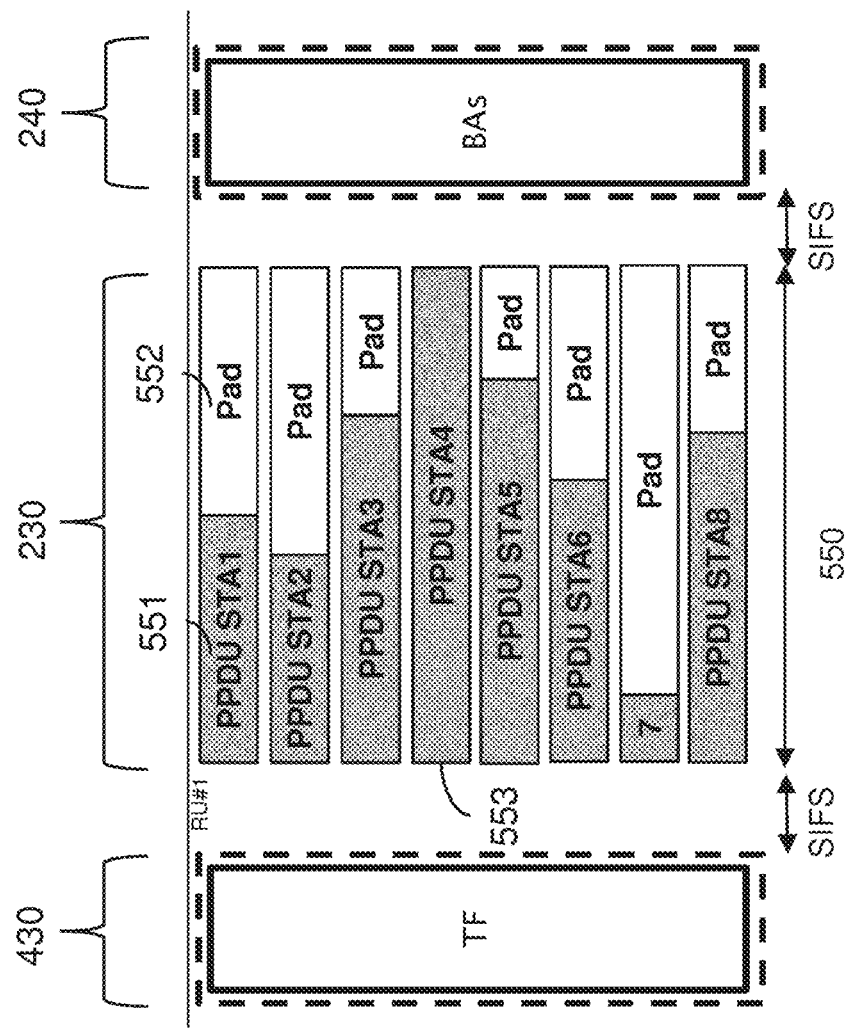

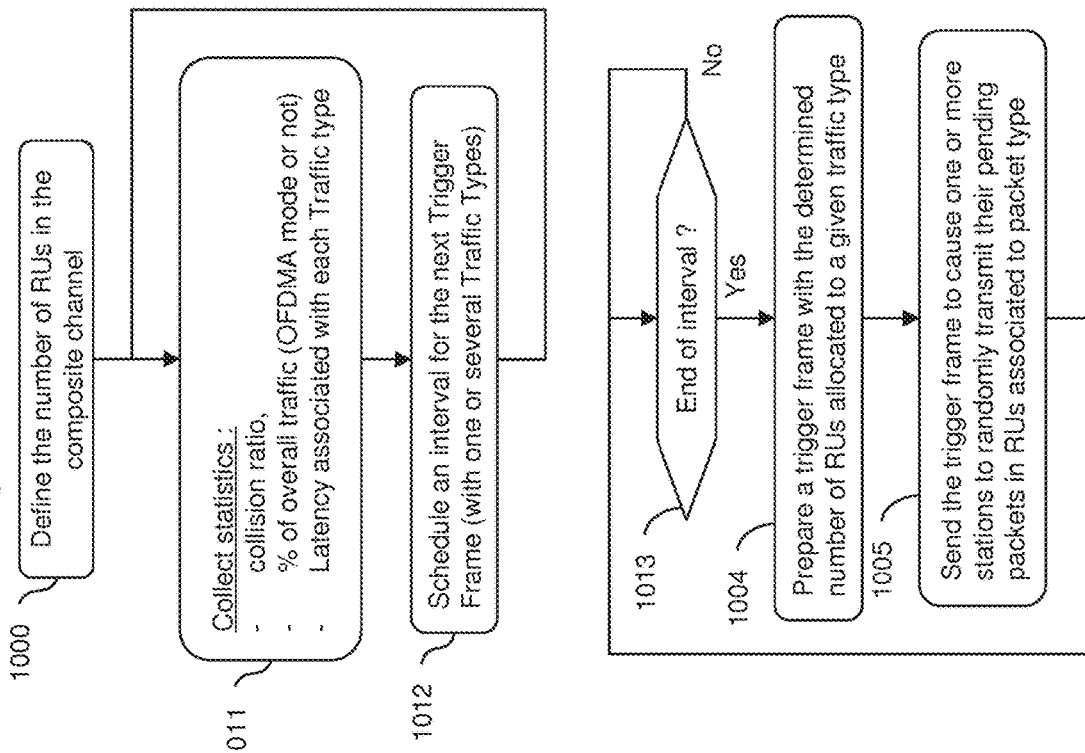
Fig. 10b AP
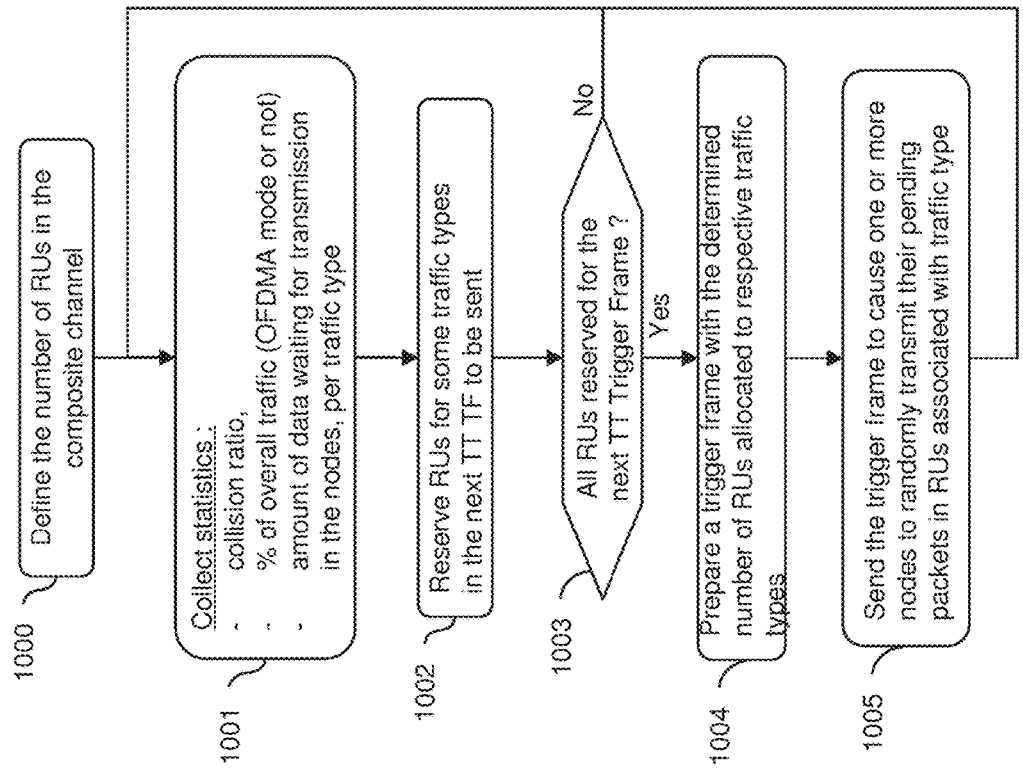
Fig. 10a AP

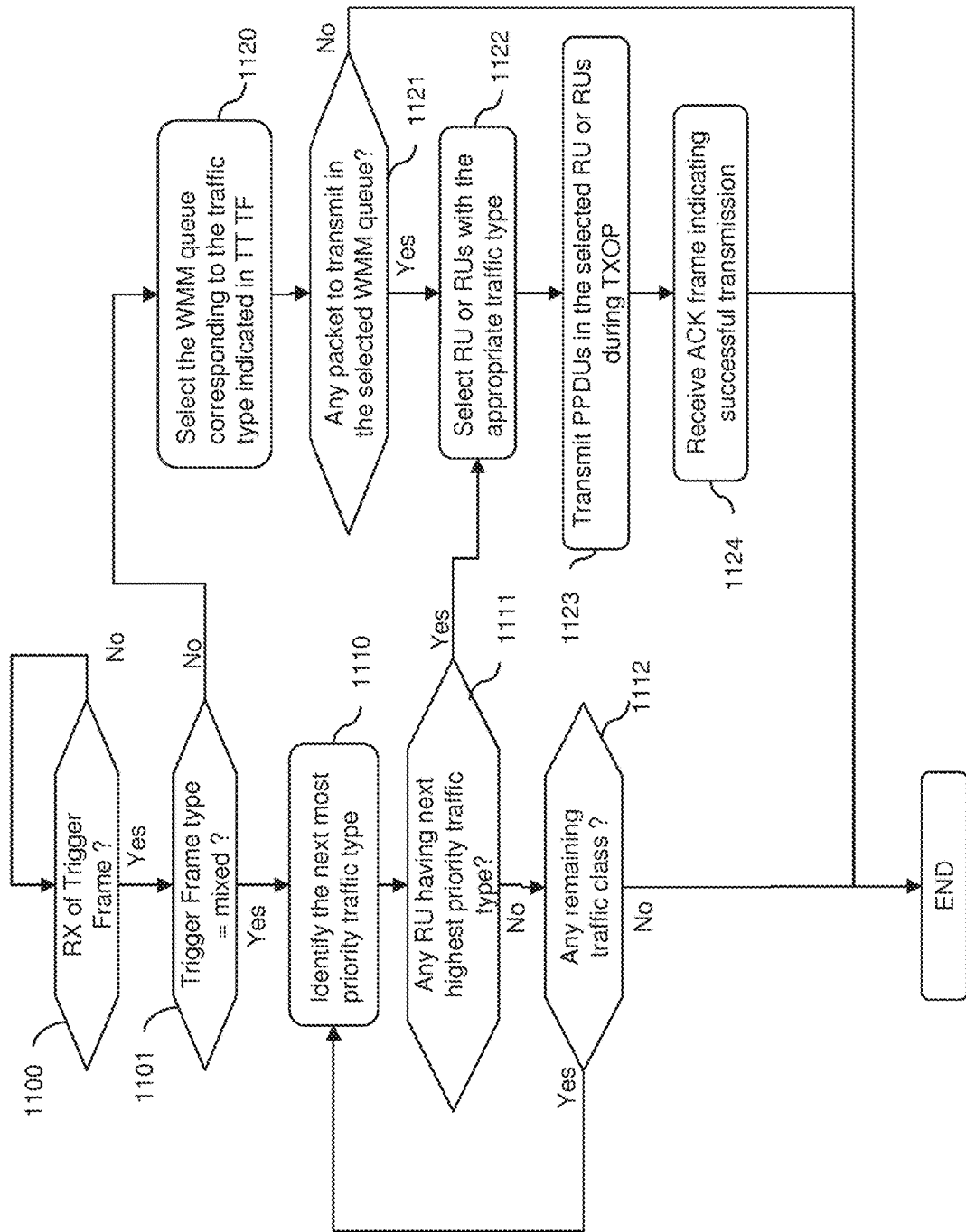
Fig. 11 STA

TRIGGER FRAMES ADAPTED TO PACKET-BASED POLICIES IN AN 802.11 NETWORK

FIELD OF THE INVENTION

The present invention relates generally to wireless communication networks and more specifically to the random allocation for Uplink communication of OFDMA sub-channels (or Resource Units) forming for instance a communication composite channel. One application of the method regards wireless data communication over a wireless communication network using Carrier Sense Multiple Access with Collision Avoidance (CSMA/CA), the network being accessible by a plurality of node devices.

BACKGROUND OF THE INVENTION

The IEEE 802.11 MAC standard defines the way Wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the wireless medium to become idle so as to try to access to the wireless medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz to be used, two of which may optionally be combined to get a 160 MHz channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each. The primary channel is used by the communication nodes to sense whether or not the channel is idle, and the primary channel can be extended using the secondary channel or channels to form a composite channel.

Sensing of channel idleness is made using CCA (clear channel assessment), and more particularly CCA-ED, standing for CCA-Energy Detect. CCA-ED is the ability of any node to detect non-802.11 energy in a channel and back off data transmission. An ED threshold based in which the energy detected on the channel is compared is for instance defined to be 20 dB above the minimum sensitivity of the PHY layer of the node. If the in-band signal energy crosses this threshold, CCA is held busy until the medium energy becomes below the threshold anew.

Given a tree breakdown of the operating band into elementary 20 MHz channels, some secondary channels are named tertiary or quaternary channels.

In 802.11ac, all the transmissions, and thus the possible composite channels, include the primary channel. This is because the nodes perform full Carrier Sense Multiple Access/Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel.

An issue with the use of composite channels as defined in the 802.11n or 802.11ac (or 802.11ax) is that the 802.11n and 802.11ac-compliant nodes (i.e. HT nodes standing for High Throughput nodes) and the other legacy nodes (i.e. non-HT nodes compliant only with for instance 802.11a/b/g) have to co-exist within the same wireless network and thus have to share the 20 MHz channels.

To cope with this issue, the 802.11n and 802.11ac standards provide the ability to duplicate control frames (e.g. RTS/CTS or CTS-to-Self or ACK frames to acknowledge correct or erroneous reception of the sent data) in an 802.11a legacy format (called as "non-HT") to establish a protection of the requested TXOP over the whole composite channel.

This is for any legacy 802.11a node that uses any of the 20 MHz channel involved in the composite channel to be aware of on-going communications on the 20 MHz channel used. As a result, the legacy node is prevented from initiating a new transmission until the end of the current composite channel TXOP granted to an 802.11n/ac node.

As originally proposed by 802.11n, a duplication of conventional 802.11a or "non-HT" transmission is provided to allow the two identical 20 MHz non-HT control frames to be sent simultaneously on both the primary and secondary channels forming the used composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non-HT" transmission of a given control frame over secondary 20 MHz channel(s) of the (40 MHz 80 MHz or 160 MHz) operating band.

In practice, to request a composite channel (equal to or greater than 40 MHz) for a new TXOP, an 802.11n/ac node does an EDCA backoff procedure in the primary 20 MHz channel. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before the backoff counter expires).

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

Recent developments in the 802.11ax standard sought to optimize usage of the composite channel by multiple nodes in a wireless network having an access point (AP). Indeed, typical contents have important amount of data, for instance related to high-definition audio-visual real-time and interactive content. Furthermore, it is well-known that the performance of the CSMA/CA protocol used in the IEEE 802.11 standard deteriorates rapidly as the number of nodes and the amount of traffic increase, i.e. in dense WLAN scenarios.

The number of large collisions and associated retransmissions substantially increases as the network density increases.

A problematic situation regards so-called "small packets", i.e. MAC packets that intrinsically suffer from an important overhead (relative to the amount of payload data) due for instance to the MAC header, to the waiting times to access the wireless medium, etc. The higher the number of small packets, the higher the loss of network bandwidth due to corresponding overhead, and thus the higher the number of collisions and retransmissions associated with small packets.

In addition, the problematic situation is getting worse since, although the overhead due to the MAC header is fixed, the waiting time increases with the number of nodes (the medium to access is shared between a higher number of nodes) and with the number of collisions.

The well-established traffics (or scheduled traffics managed by the AP) may thus suffer from small packets conveyed on the network.

However, the scheduled traffics are not the principal ones in a basic service set (BSS) made of the AP and its registered nodes.

For the nodes to coordinate together, a new hybrid coordination function (HCF) has been introduced that includes two methods of channel access: HCF Controlled Channel Access (HCCA) and Enhanced Distributed Channel Access (EDCA). Both EDCA and HCCA define Traffic Categories (TC) to adjust QoS (Quality of Service) support by differentiating and negotiating node service parameters. For instance, an email could be assigned to a low priority class, and Voice over Wireless LAN (VoWLAN) could be assigned to a high priority class.

Four Access Categories are defined:
AC_BK is the lowest priority for background data,
AC_BE is the next priority for best-effort data,
AC_VI is the priority for video applications, and
AC_VO is the priority for voice applications.

Each access category owns substantially two traffic classes as defined in the IEEE standard 802.11. In the document below, traffic classes and access categories are indifferently used to designate the same idea.

These QoS traffics are by essence unfair. Collisions and retransmissions are exacerbated in dense environments like the ones addressed by 802.11ax, thus conducting to poor efficiency of the wireless medium, In this context, multi-user transmission has been considered to allow multiple simultaneous transmissions to/from different users in both downlink and uplink directions. In the uplink, multi-user transmissions can be used to mitigate the collision probability by allowing multiple nodes to simultaneously transmit and to improve network capacity by mutualizing the overhead (header, waiting times . . . ) over the MAC packets.

To actually perform such multi-user transmission, it has been proposed to split a granted 20 MHz channel into sub-channels (elementary sub-channels), also referred to as resource units (RUs), that are shared in the frequency domain by multiple users, based for instance on Orthogonal Frequency Division Multiple Access (OFDMA) technique.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different sub-carriers or tones to be assigned to different nodes in order to increase concurrency. Adjacent sub-carriers often experience similar channel conditions and are thus grouped to sub-channels: an OFDMA sub-channel or RU is thus a set of sub-carriers or tones.

As currently envisaged, the granularity of such OFDMA sub-channels is finer than the original 20 MHz channel band. Typically, a 2 MHz or 5 MHz sub-channel may be contemplated as a minimal width, therefore defining for instance nine sub-channels or resource units within a single 20 MHz channel.

To support multi-user uplink, i.e. uplink transmission to the 802.11ax access point (AP) during the granted TxOP, the 802.11ax AP has to provide signalling information for the legacy nodes (non-802.11ax nodes) to set their NAV and for the 802.11ax nodes to determine the allocation of the resource units RUs, and to be used as a reference time for the synchronization of the data emission.

It has been proposed for the AP to send a trigger frame (TF) to the 802.11ax nodes to trigger uplink communications.

The document IEEE 802.11-15/0365 proposes that a 'Trigger' frame (TF) is sent by the AP to solicit the transmission of uplink (UL) Multi-User (OFDMA) PPDU from multiple nodes. In response, the nodes transmit UL MU (OFDMA) PPDU as immediate responses to the Trigger frame. All transmitters can send data at the same time, but using disjoint sets of RUs (i.e. of frequencies in the OFDMA scheme), resulting in transmissions with less interference.

OFDMA to provide multi-user transmission in 802.11ax requires accurate inter-user symbol synchronization to keep the orthogonality among the different OFDMA sub-channels or RUs.

In addition, the various nodes transmitting PPDUs on the RUs have to synchronize the end of their PPDUs transmission, Otherwise, if a node ends its transmission earlier, the unused RU could be acquired by an OBSS (Overlapping Base Station Subsystem) node, which may then initiate a new transmission.

This may cause interference with the following Block Acknowledgements (BAs) sent by the AP to the nodes.

This may also disturb the AP when receiving of the other on-going PPDUs.

To synchronize the end of their PPDUs transmission, the nodes must send data on their RUs until the end of the TXOP time duration indicated in the trigger frame. In practice, the nodes starts sending padding data (as defined in the document IEEE 802.11-15/617) if they end transmitting payload data before the end of the TXOP.

The bandwidth or width of the targeted composite channel is also signalled in the TF frame, meaning that the 20, 40, 80 or 160 MHz value is added. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF on its primary channel, then sets its NAV to the TXOP duration value specified in the TF frame. This prevents these legacy nodes from accessing the channels of the targeted composite channel during the TXOP.

A resource unit RU can be reserved for a specific node, in which case the AP indicates, in the TF, the node to which the RU is reserved. Such RU is called Scheduled RU. The indicated node does not need to perform contention on accessing a scheduled RU reserved to it.

In order to better improve the efficiency of the system in regards to unmanaged traffic to the AP (for example, uplink management frames from associated nodes, non-associated nodes intending to reach an AP, or simply unmanaged data traffic), the document IEEE 802.11-15/0604 proposes a new trigger frame (TF-R) above the previous UL MU procedure, allowing random access onto the OFDMA TXOP. In other words, the resource unit RU can be randomly accessed by more than one node. Such RU is called Random RU and is indicated as such in the TF. Random RUs may serve as a basis for contention between nodes willing to access the communication medium for sending data.

The random resource selection procedure is not yet defined. All that is known is that the trigger frame may define only Scheduled RUs, or only Random RUs within the targeted composite channel.

Whatever the random resource selection procedure used, multi-user transmission based on the Trigger Frame mechanism should improve network capacity by mutualizing the overhead over the nodes. Indeed, waiting time overhead is reduced on overall.

However, it is believed that the Trigger Frame mechanism still suffers from overhead issue, mainly moved from waiting time to padding time.

To be precise, the Trigger Frame mechanism provides only generic RU in which padding must be performed to ensure reaching the end of the TXOP and to avoid interference with legacy nodes. Such padding adds to the overall cost of overhead. This additional overhead cost due to padding is exacerbated for the so-called small packets, since they use a very little portion of allocated RUs.

So, particularly for small packets, the gain in reducing the waiting time may not be enough to compensate the loss due to padding. As a result, the total overhead may not be reduced, contrary to the intended goal when introducing the Trigger Frame mechanism.

Apart from the small packet situation, different kinds of data traffic usually cohabit in the various RUs, each with different requirements in term of data quantity to transmit, latency. TxOP duration, etc. Such heterogeneity of the different PPDUs transmitted by the nodes may result in having a huge quantity of padding data in some RUs, and hence in drastically reducing the efficiency of the channel usage.

It may be noted that the padding issue may also be accentuated by the use of different modulations (Modulation and Coding Scheme) to handle the distance (node to AP) and Signal Noise Ratio variation (channel conditions change) through the different paths, i.e. through the different RUs involving different nodes.

Thus, there is a need to improve this situation and to reduce the impact of padding in network usage efficiency.

In addition, it may also be taken advantage of the different kinds of data traffic cohabiting in the various RUs to improve the usage of the network.

SUMMARY OF INVENTION

It is a broad objective of the present invention to provide wireless communication methods and devices in a wireless network. The wireless network includes an access point and a plurality of nodes, all of them sharing the physical medium of the wireless network.

The present invention has been devised to overcome one or more foregoing limitations.

In this context, the present invention seeks to provide wireless communication methods improving usage of the network and, in turns, having improved mechanisms against collisions in communication channels.

The invention can be applied to any wireless network in which an access point provides the registered nodes with a plurality of sub-channels (or resource units) forming a communication channel. The communication channel is the elementary channel on which the nodes perform sensing to determine whether it is idle or busy.

The invention is especially suitable for data transmission to the AP of an IEEE 802.11ax network (and future version).

First main embodiments of the invention provide, from the access point's perspective, a wireless communication method in a wireless network comprising an access point and a plurality of nodes, the method comprising, at the access point, the step of sending a trigger frame to the nodes, the trigger frame reserving at least one communication channel of the wireless network for a transmission opportunity and defining a plurality of resource units forming the communication channel, wherein the trigger frame includes an indicator restricting data to be sent on at least one of the resource units to data having a restricted type of data.

The same first main embodiments of the invention provide, from the node's perspective, a wireless communication method in a wireless network comprising an access point and a plurality of nodes, the method comprising, at one of said nodes:

receiving a trigger frame from the access point, the trigger frame reserving at least one communication channel of the wireless network for a transmission opportunity and defining a plurality of resource units forming the communication channel;

determining, from the trigger frame, an indicator defining a restricted type of data authorized for at least one of the resource units:

determining, from local transmitting memory, data having a type corresponding to the determined restricted type of data; and transmitting the determined data to the access point on the said resource unit.

Thanks to the indicator specifying the restricted type of data, the Access Point is able to drive or control the nodes in their process of selecting data to transmit on the RUs. As a consequence, the AP may efficiently adapt the RUs to data types, resulting in optimizing the use of the RUs.

Correlatively, the invention provides a communication device acting as an access point in a wireless network also comprising a plurality of nodes, the communication device acting as an access point comprising at least one microprocessor configured for carrying out the step of sending a trigger frame to the nodes, the trigger frame reserving at least one communication channel of the wireless network for a transmission opportunity and defining a plurality of resource units forming the communication channel, wherein the trigger frame includes an indicator restricting data to be sent on at least one of the resource units to data having a restricted type of data.

From the node's perspective, the invention also provides a communication device in a wireless network comprising an access point and a plurality of nodes, the communication device being one of the nodes and comprising at least one microprocessor configured for carrying out the steps of:

receiving a trigger frame from the access point, the trigger frame reserving at least one communication channel of the wireless network for a transmission opportunity and defining a plurality of resource units forming the communication channel;

determining, from the trigger frame, an indicator defining a restricted type of data authorized for at least one of the resource units;

determining, from local transmitting memory, data having a type corresponding to the determined restricted type of data; and transmitting the determined data to the access point on the said resource unit.

Optional features of embodiments of the invention are defined in the appended claims. Some of these features are explained here below with reference to a method, while they can be transposed into system features dedicated to any node device according to embodiments of the invention.

In embodiments, the restricted type of data defines small MAC packets relative to the MAC packets conveyed over the wireless network. As a consequence, the AP may force the nodes to transmit their so-called small packets. As a consequence, the nodes will less often spend time to obtain TXOP for sending small packets. This greatly contributes to reduce the overall overhead costs due to small packets. As a consequence, network usage is improved.

In specific embodiments, small MAC packets are MAC packets having a packet size lower than a predetermined maximum small packet size (i.e. threshold). For instance, the predefined maximum small packet size equals a so-called RTS Threshold parameter set for the wireless network according to the 802.11 standard. It is known that the RTS Threshold parameter is a manageable parameter of 802.11 network used to determine when (i.e. from which size of MAC packets) an RTS/CTS handshake should precede a data packet.

As a consequence, the small packets that are usually handled without RTS/CTS handshake (i.e. for which overhead due to RTS/CTS should be avoided) are processed in bursts using the TF.

In variants, small MAC packets are MAC packets having an overhead due to a MAC header in the packets that is higher than a predetermined maximum overhead (i.e. threshold), for instance 20% or 30%. Indeed, those packets having already a big internal overhead should preferably be handled together by bursts in order to avoid having too much additional overhead per packet.

There are some types of packets that intrinsically have one or the other definition above. For instance, control packets are by nature small packets.

In specific embodiments, the predetermined maximum small packet size or maximum overhead is specified in the trigger frame.

In embodiments from the access point's perspective, the method may further comprise adjusting the predetermined maximum small packet size or maximum overhead from one trigger frame to the other, based on network statistics on one or more previous transmission opportunities.

These two provisions make it possible for the AP to efficiently drive the management of the small packets, as the network conditions evolve.

In embodiments from the node's perspective, the node's local transmitting memory includes a plurality of ordered transmitting queues, each being associated with a dynamic priority value (i.e. the priority value evolves over time. In 802.11 scheme, the priority value corresponds to the value of a contention backoff counter associated with each transmitting queue); and determining data having a type corresponding to the determined restricted type of data comprises selecting at least one small packet from a set of one or more small packets, the set being made of one from:

the first small packet from the transmitting queue having the highest priority value, the first small packet from each transmitting queue, all the small packets from all the transmitting queue, all the packets of a transmitting queue storing only small packets.

Strategy on the nodes may thus be adapted.

In embodiments, the said one resource unit has minimal frequency width authorized by the 802.11 standard. Currently, the 20 MHz channel can be split into a maximum of nine identical resource units, i.e. with a minimal frequency width of 2.03 MHz. This provision optimizes the use of the RUs to small packets. As a result, it also increases the number of nodes that can send small packets on the RUs of the granted composite channel.

In embodiments, the restricted type of data defines a traffic type of data. As a consequence, the AP may force the nodes to transmit some kinds of data in response to specific TF. As it will transpires from below, the AP will then adapt the RUs according to the traffic types allowed, in order to optimize usage of the network bandwidth.

In specific embodiments, the restricted traffic type of data is one of the four access categories defined in the 802.11 standard, namely AC_BK for background data, AC_BE for best-effort data, AC_VI for video applications and AC_VO for voice applications.

In specific embodiments from the AP's perspective, the method further comprises determining the restricted traffic type of data from a plurality of predefined traffic types (for instance the four access categories above), based on:

either network statistics on the amount of data received in one or more previous transmission opportunities for each of the predefined traffic types, or a total queue size for each of the predefined traffic types, a total queue size for a predefined traffic type summing the sizes of transmission queues that are associated, in the nodes, with the predefined traffic type. The AP may obtain such information from each node because the 802.11 standard MAC header of the PPDUs sent by the nodes includes a "Queue Size" field through which the nodes indicate the amount of their buffered traffic for a given traffic type. So the AP is able to compute global statistics on the total queue size for each traffic type and to build an associated trigger frame with dedicated RU traffic type.

In specific embodiments from the node's perspective, determining, from local transmitting memory, data having a type corresponding to the determined restricted type of data includes selecting data in a transmitting queue storing data having only the determined restricted type of data. This particularly applies to the case where the restricted type of data is one of the four access categories defined above. In that case, processing at the node is very simple since it only has to access a single transmitting queue, depending on the restricted type of data associated with the RU used.

In specific embodiments from the node's perspective, the node's local transmitting memory includes a plurality of transmitting queues, each being associated with a dynamic priority value and with a traffic type, and the method further comprises:

successively considering the transmitting queue according to an highest-to-lowest priority value order, until data is sent on a resource unit, and for each transmitting queue successively considered, determining whether a resource unit in the communication channel has the restricted traffic type, and in case of positive determination, transmitting data from the transmitting queue currently considered on the determined resource unit.

This configuration keeps the priority order as defined in 802.11 standard, thus keeping fairness between the nodes.

In embodiments, the method further comprises determining a frequency of sending a trigger frame having a restricted type indicator, based on network statistics on one or more previous transmission opportunities. This contributes to improve network usage since the AP dynamically adapts the number of opportunities for the nodes to transmit specific data (small packets or having traffic types) to the network conditions.

In other embodiments, the method further comprises determining the number of resource units forming the communication channel, based on network statistics on one or more previous transmission opportunities. This contributes to improve network usage since the number of nodes that can transmit data during the next TXOP is dynamically adjusted to the network conditions.

In specific embodiments, the network statistics include one or more from:

a number of nodes registered to the access point in the wireless network, a number of collisions or a collision ratio (number of colliding RUs out of the number of RUs) occurring during the one or more previous transmission opportunities, a distribution of packet sizes received by the access point, in particular a packet size distribution relative to a maximum packet size (i.e. defining the small packets), an amount of data transmitted by the nodes, an amount of data transmitted by the nodes for each traffic type from among a plurality of predefined traffic types, a ratio of medium busyness, for instance the ratio of a medium busy time on a given period (e.g. one second).

In embodiments, the trigger frame includes a single indicator that define the same restricted type of data for all the resource units of the at least one communication channel, i.e. for the whole composite channel. Overhead due to the indicator is thus minimized.

In variants, the trigger frame includes one indicator per resource unit, thus defining various restricted types of data for various respective resource units. This is to allow more nodes to send data during the current TXOP, since nodes having different types of data may now send through respective RUs within the same communication channel.

Second main embodiments of the invention provide, from the access point's perspective, a wireless communication method in a wireless network comprising an access point and a plurality of nodes, the method comprising, at the access point, the step of sending a trigger frame to the nodes, the trigger frame reserving at least one communication channel of the wireless network for a transmission opportunity and defining a plurality of resource units forming the communication channel, at least one resource unit having a predefined resource unit frequency width, wherein the method further comprises, at the access point, the step of determining a duration of the transmission opportunity based on the predefined resource unit frequency width and a predetermined maximum small packet size, so that the at least one resource unit can only include MAC packets having a packet size lower than the predetermined maximum small packet size.

This configuration makes it possible for the access point to force the nodes to transmit their so-called small packets (i.e. having a packet size lower than a predetermined maximum packet size). This is achieved by sizing the TXOP in an appropriate manner given the predefined width of the resource unit.

One advantage of using this approach to force transmission of small packets is that it is fully compliant with 802.11ax standard. Indeed, no addition information is provided, and the nodes still perform the same process to select data matching the RU offers.

Correlatively, the invention provides a communication device acting as an access point in a wireless network also comprising a plurality of nodes, the communication device acting as an access point comprising at least one microprocessor configured for carrying out the step of sending a trigger frame to the nodes, the trigger frame reserving at least one communication channel of the wireless network for a transmission opportunity and defining a plurality of resource units forming the communication channel, at least one resource unit having a predefined resource unit frequency width, wherein the microprocessor is further configured for carrying out the step of determining a duration of the transmission opportunity based on the predefined resource unit frequency width and a predetermined maximum small packet size, so that the at least one resource unit can only include MAC packets having a packet size lower than the predetermined maximum small packet size.

Optional features of embodiments of the invention are defined in the appended claims. Some of these features are explained here below with reference to a method, while they can be transposed into system features dedicated to any node device according to embodiments of the invention.

In embodiments, the predefined maximum small packet size equals a so-called RTS Threshold parameter set for the wireless network according to the 802.11 standard.

In embodiments, the predefined resource unit width is a minimal frequency width authorized by the 802.11 standard.

A frequency for sending such a trigger frame or the number of resource units in the communication channel may also be determined dynamically as explained above with reference to the first main embodiments.

Third main embodiments of the invention provide, from the access point's perspective, a wireless communication method in a wireless network comprising an access point and a plurality of nodes, the method comprising, at the access point, the step of:

sending a trigger frame to the nodes, the trigger frame reserving at least one communication channel of the wireless network for a transmission opportunity and defining a plurality of resource units forming the communication channel, the plurality of resource units having the same time length;

wherein resource units within the communication channel have different frequency widths.

The same third main embodiments of the invention provide, from the node's perspective, a wireless communication method in a wireless network comprising an access point and a plurality of nodes, the method comprising, at one of said nodes, the steps of:

receiving a trigger frame from the access point, the trigger frame reserving at least one communication channel of the wireless network for a transmission opportunity and a plurality of resource units forming the communication channel, the plurality of resource units having the same time length, and transmitting data to the access point on one of the resource units, wherein resource units within the communication channel have different frequency widths.

Use of network bandwidth is optimized. This is achieved by having resource units with different frequency widths, i.e. with different transmission capacities.

As a consequence, the nodes may efficiently select resource units matching their needs, in order to minimize the padding.

Correlatively, the invention provides a communication device acting as an access point in a wireless network also comprising a plurality of nodes, the communication device acting as an access point comprising at least one microprocessor configured for carrying out the step of sending a trigger frame to the nodes, the trigger frame reserving at least one communication channel of the wireless network for a transmission opportunity and defining a plurality of resource units forming the communication channel, the plurality of resource units having the same time length;

wherein resource units within the communication channel have different frequency widths.

From the node's perspective, the invention also provides a communication device in a wireless network comprising an access point and a plurality of nodes, the communication device being one of the nodes and comprising at least one microprocessor configured for carrying out the steps of:

receiving a trigger frame from the access point, the trigger frame reserving at least one communication channel of the wireless network for a transmission opportunity and a plurality of resource units forming the communication channel, the plurality of resource units having the same time length, and transmitting data to the access point on one of the resource units, wherein resource units within the communication channel have different frequency widths.

Optional features of embodiments of the invention are defined in the appended claims. Some of these features are explained here below with reference to a method, while they can be transposed into system features dedicated to any node device according to embodiments of the invention.

In embodiments, each resource unit is associated with a traffic type of data selected from the four access categories defined in the 802.11 standard, namely AC_BK for background data, AC_BE for best-effort data, AC_VI for video applications and AC_VO for voice applications.

In specific embodiments, the resource unit or units associated with AC_BK and AC_BE traffic type have a first frequency width, the resource unit or units associated with AC_VO have a frequency width equal to twice the first frequency width and the resource unit or units associated with AC_VI have a frequency width equal to four times the first frequency width. This provision optimizes usage of the bandwidth since the RU sizes are adapted to the size of the content they convey. As a result the resource units dedicated to small contents are sized accordingly in order to avoid too many padding.

In more specific embodiments, the first frequency width equals a minimal frequency width authorized by the 802.11 standard. Currently, the 20 MHz channel is split into a maximum of nine identical resource units, i.e. the minimal frequency width is 2.03 MHz. This is to offer the best granularity for the access point when designing the resource units.

In specific embodiments, the same time length of the resource units is less or equal to a quarter of a TXOP Limit parameter set for the wireless network according to the 802.11 standard. This provision is advantageously combined with the above relative sizing (width) of the resource units depending on their associated AC_BK, AC_BE, AC_VI or AC_VO traffic types. Indeed, playing on the RU width makes it possible to substantially reduce the duration of the TXOP, and thus the padding for the under-used RUs.

In embodiments relating to the nodes, each resource unit is associated with a traffic type of data, and the method further comprises, at the node:

transmitting, on one resource unit, data having the same traffic type as the traffic type associated with the resource unit.

This helps the access point to drive the way the nodes use the resource units. The access node may define the traffic type for each resource unit in the trigger frame.

In embodiments, the node includes a plurality of transmitting queues storing data to be sent, each being associated with a dynamic priority value; and the method further comprises:

determining whether one of the resource units matches the amount of data to be sent in the transmitting queue having the highest priority value, and in case of positive determining, transmitting the data of the transmitting queue having the highest priority value on the matching resource unit.

Of course, the other transmitting queues may be successively considered according to the priority order, in order to transmit their content in appropriate (i.e. well-sized) RUs.

In embodiments, the method further comprises adapting a modulation scheme for modulating the data on the resource unit, the adapting maximizing the time duration of transmitting the data within the transmission opportunity. This also contributes to reduce the padding in the RUs, while strengthening the data against errors occurring on the communication channel.

In embodiments relating to the access point, each resource unit is associated with a traffic type of data, and the method further comprises:

determining the frequency widths of the resource units based on statistics on data related to each traffic type as received in one or more previous transmission opportunities.

This is for the access point to dynamically adjust the RU design to the node needs, i.e. as the network conditions evolve.

In specific embodiments, the frequency widths of the resource units are further adjusted based on the number of nodes registered to the access point. This provision also helps adjusting the number of RUs based on the number of nodes, since the frequency widths of the RUs may be adjusted to make it possible to add or remove one or more RUs in the communication channel.

In specific embodiments, the frequency width of a resource unit associated with a traffic type is further adjusted based on a modulation scheme used by the nodes to send data having the associated traffic type in one or more previous transmission opportunities. This provision helps reducing padding in the RUs when the transmission of useful data ends, while strengthening the robustness of the transmitted data against transmission errors.

In embodiments, the method further comprises determining the number of resource units forming the communication channel, based on network statistics on one or more previous transmission opportunities.

The same statistics as defined above may be used. In particular, the type of data traffic (video, voice, background, best effort), the quantity of each data traffic type, the number of nodes, the modulation scheme (MCS) used by each node, the modulation scheme (MCS) used on each RU, the identification of steady traffic (video streaming, VoIP . . . ) or random traffic (Web browsing, control frame . . . ), may be used.

Another aspect of the invention relates to a non-transitory computer-readable medium storing a program which, when executed by a microprocessor or computer system in a device of a wireless network, causes the device to perform any method as defined above.

The non-transitory computer-readable medium may have features and advantages that are analogous to those set out above and below in relation to the methods and node devices.

Another aspect of the invention relates to a wireless communication method in a wireless network comprising an access point and a plurality of nodes, substantially as herein described with reference to, and as shown in, FIG. 8 or FIG. 9 or FIG. 10 or FIG. 11 or FIG. 12 or FIG. 13 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 5a illustrates an example of use of eight RUs forming a composite channel;

FIG. 10 illustrates, using a flowchart, general steps of second embodiments of the present invention, from an access point's perspective;

FIG. 11 illustrates, using a flowchart, general steps of the second embodiments of the present invention, from a node's perspective;

DETAILED DESCRIPTION

The invention will now be described by means of specific non-limiting exemplary embodiments and by reference to the figures.

Figure 1:
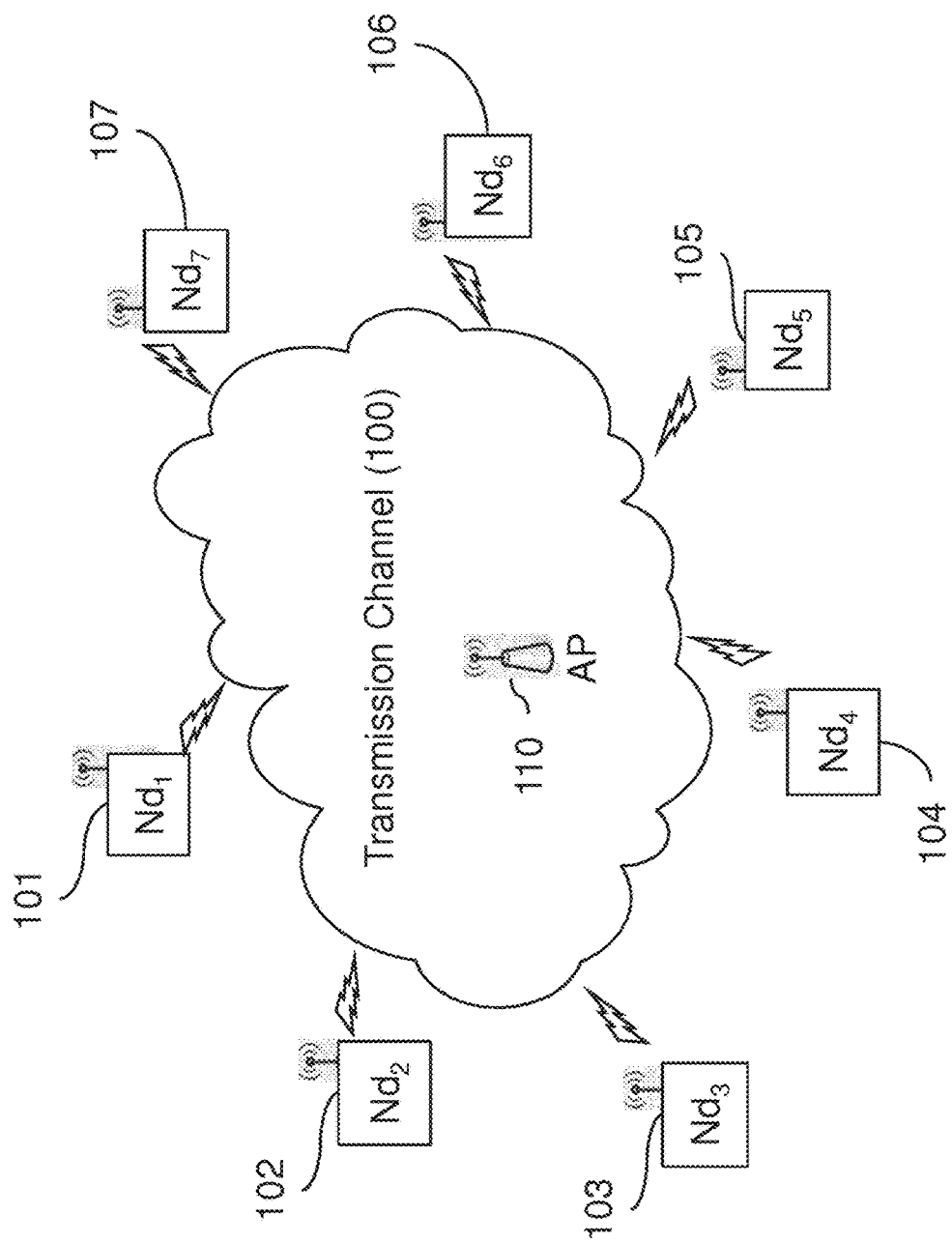
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle. To do so, it starts a countdown backoff counter designed to expire after a number of timeslots, chosen randomly between [0, CW], CW (integer) being referred to as the Contention Window. This backoff mechanism or procedure is the basis of the collision avoidance mechanism that defers the transmission time for a random interval, thus reducing the probability of collisions on the shared channel. After the backoff time period, the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure. However, this can be seen as a bandwidth waste if only the ACK has been corrupted but the data frames were correctly received by the receiving node.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

Figure 2:
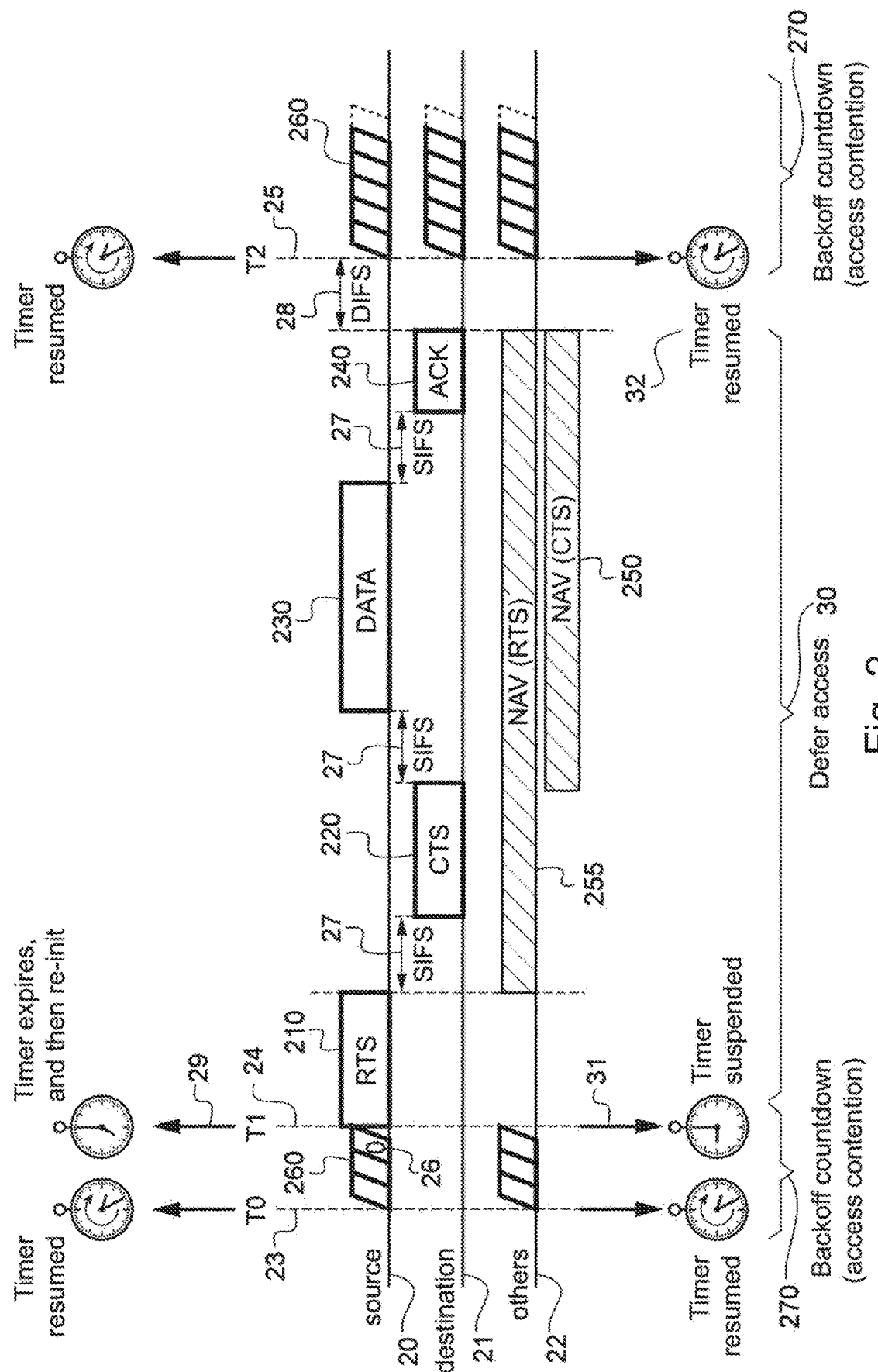
FIG. 2 is a timeline schematically illustrating a conventional communication mechanism according to the IEEE 802.11 standard.

FIG. 2 illustrates the behaviour of three groups of nodes during a conventional communication over a 20 MHz channel of the 802.11 medium: transmitting or source node 20, receiving or addressee or destination node 21 and other nodes 22 not involved in the current communication.

Upon starting the backoff process 270 prior to transmitting data, a station e.g. source node 20, initializes its backoff time counter to a random value as explained above. The backoff time counter is decremented once every time slot interval 260 for as long as the radio medium is sensed idle (countdown starts from T0, 23 as shown in the Figure).

Channel sensing is for instance performed using Clear-Channel-Assessment (CCA) signal detection.

CCA is a WLAN carrier sense mechanisms defined in the IEEE 802.11-2007 standards as part of the Physical Medium Dependant (PMD) and Physical Layer Convergence Protocol (PLOP) layer. It involves two functions:

Carrier Sense (CCA-CS) which is the ability of the receiving node to detect and decode an 802.11 frame preamble. From the PLOP header field, the time duration for which the medium will be occupied can be inferred and when such 802.11 frame preamble is detected, a CCA flag is held busy until the end of data transmission.

Energy Detect (CCA-ED) which is the ability of the receiving node to detect non-802.11 energy in a specific 20 MHz channel and back off data transmission. In practice, a level of energy over the 20 MHz channel is sensed and compared to an ED threshold discriminating between a channel state with or without 802.11 energy channel. The ED threshold is for instance defined to be 20 dB above the minimum sensitivity of a PHY layer of the node. If the in-band signal energy crosses this threshold, CCA is held busy until the medium energy becomes below the threshold anew.

The time unit in the 802.11 standard is the slot time called 'aSlotTime' parameter. This parameter is specified by the PHY (physical) layer (for example, aSlotTime is equal to 9 µs for the 802.11n standard). All dedicated space durations (e.g. backoff) add multiples of this time unit to the SIFS value.

The backoff time counter is 'frozen' or suspended when a transmission is detected on the radio medium channel (countdown is stopped at T1, 24 for other nodes 22 having their backoff time counter decremented).

The countdown of the backoff time counter is resumed or reactivated when the radio medium is sensed idle anew, after a DIFS time period. This is the case for the other nodes at T2, 25 as soon as the transmission opportunity TXOP granted to source node 20 ends and the DIFS period 28 elapses. DIFS 28 (DCF inter-frame space) thus defines the minimum waiting time for a source node before trying to transmit some data. In practice, DIFS=SIFS+2*aSlotTime.

When the backoff time counter reaches zero (26) at T1, the timer expires, the corresponding node 20 requests access onto the medium in order to be granted a TXOP, and the backoff time counter is reinitialized 29 using a new random backoff value.

In the example of the Figure implementing the RTS/CTS scheme, at T1, the source node 20 that wants to transmit data frames 230 sends a special short frame or message acting as a medium access request to reserve the radio medium, instead of the data frames themselves, just after the channel has been sensed idle for a DIFS or after the backoff period as explained above.

The medium access request is known as a Request-To-Send (RTS) message or frame. The RTS frame generally includes the addresses of the source and receiving nodes ("destination 21") and the duration for which the radio medium is to be reserved for transmitting the control frames (RTS/CTS) and the data frames 230.

Upon receiving the RTS frame and if the radio medium is sensed as being idle, the receiving node 21 responds, after a SIFS time period 27 (for example, SIFS is equal to 16 µs for the 802.11n standard), with a medium access response, known as a Clear-To-Send (CTS) frame. The CTS frame also includes the addresses of the source and receiving nodes, and indicates the remaining time required for transmitting the data frames, computed from the time point at which the CTS frame starts to be sent.

The CTS frame is considered by the source node 20 as an acknowledgment of its request to reserve the shared radio medium for a given time duration.

Thus, the source node 20 expects to receive a CTS frame 220 from the receiving node 21 before sending data 230 using unique and unicast (one source address and one addressee or destination address) frames.

The source node 20 is thus allowed to send the data frames 230 upon correctly receiving the CTS frame 220 and after a new SIFS time period 27.

To provide QoS support, 802.11 has defined various levels of priorities for data the source node 20 wants to transmit. The levels are mainly defined based on the nature of the data.

In 802.11e, four Access Categories (AC) are defined:
AC_BK has the lowest priority for background data,
AC_BE has the next priority for best-effort data,
AC_VI has higher priority for video applications, and
AC_VO has the highest priority for voice applications.

Each access category owns one or more traffic classes as defined in the IEEE standard 802.11e-2005.

In practice, the source node 20 has one transmitting buffer queue for each access category and thus implements a backoff counter for each access category. The backoff counter having the lowest value from among the four AC backoff counter is considered as being the backoff counter for the node as discussed above, since it is the first one to reach zero.

An ACK frame 240 is sent by the receiving node 21 after having correctly received the data frames sent, after a new SIFS time period 27.

If the source node 20 does not receive the ACK 240 within a specified ACK Timeout (generally within the TXOP), or if it detects the transmission of a different frame on the radio medium, it reschedules the frame transmission using the backoff procedure anew.

Since the RTS/CTS four-way handshaking mechanism 210/220 is optional in the 802.11 standard, it is possible for the source node 20 to send data frames 230 immediately upon its backoff time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will remain busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening nodes 22 thus keep in memory the time duration for which the radio medium will remain busy.

Access to the radio medium for the other nodes 22 is consequently deferred 30 by suspending 31 their associated timer and then by later resuming 32 the timer when the NAV has expired.

This prevents the listening nodes 22 from transmitting any data or control frames during that period.

It is possible that receiving node 21 does not receive RTS frame 210 correctly due to a message/frame collision or to fading. Even if it does receive it, receiving node 21 may not always respond with a CTS 220 because, for example, its NAV is set (i.e. another node has already reserved the medium). In any case, the source node 20 enters into a new backoff procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS 28 (DCF inter-frame space) or when their own back-off counter has reached zero nearly at the same time T1. If both source nodes use the RTS/CTS mechanism, this collision can only occur for the RTS frames. Fortunately, such collision is early detected by the source nodes since it is quickly determined that no CTS response has been received.

As described above, the original IEEE 802.11 MAC always sends an acknowledgement (ACK) frame 240 after each data frame 230 received.

However, such collisions limit the optimal functioning of the radio network. As described above, simultaneous transmission attempts from various wireless nodes lead to collisions. The 802.11 backoff procedure was first introduced for the DCF mode as the basic solution for collision avoidance. In the emerging IEEE 802.11n/ac/ax standards, the backoff procedure is still used as the fundamental approach for supporting distributed access among mobile stations or nodes.

Figure 3:
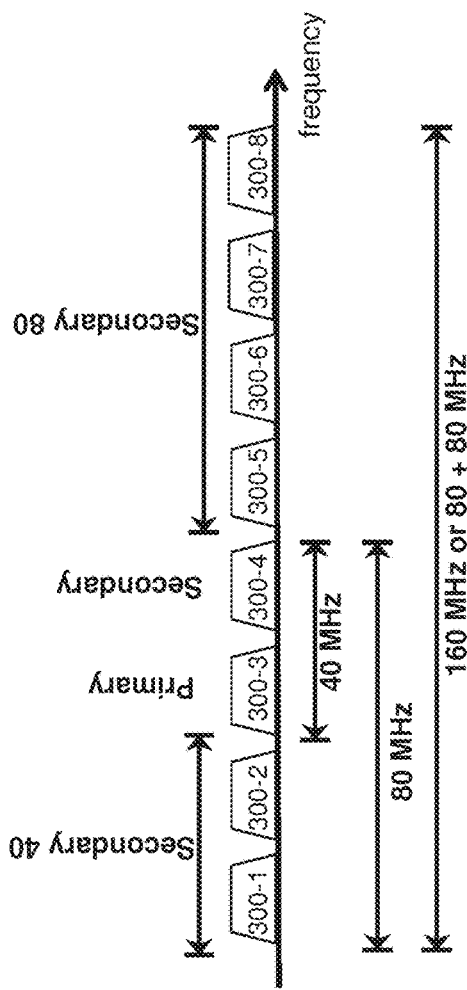
FIG. 3 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 3 illustrates 802.11ac channel allocation that support composite channel bandwidth of 20 MHz, 40 MHz, 80 MHz or 160 MHz IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively.

A node is granted a TxOP through the enhanced distributed channel access (EDCA) mechanism on the "primary channel" (300-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered to the same local Access Point (AP).

However, to make sure that no other legacy node (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user transmission features, allowing multiple simultaneous transmissions to different users in both downlink and uplink directions. In the uplink, multi-user transmissions can be used to mitigate the collision probability by allowing multiple nodes to simultaneously transmit.

To actually perform such multi-user transmission, it has been proposed to split a granted 20 MHz channel (300-1 to 300-4) into sub-channels 410 (elementary sub-channels), also referred to as sub-carriers or resource units (RUs), that are shared in the frequency domain by multiple users, based for instance on Orthogonal Frequency Division Multiple Access (OFDMA) technique. Each RU may be defined by a number of tones, the 20 MHz channel containing up to 242 usable tones.

This multi-user transmission is illustrated with reference to FIG. 4.

The multi-user feature of OFDMA allows the AP to assign different RUs to different nodes in order to increase competition. This may help to reduce contention and collisions inside 802.11 networks.

Contrary to downlink OFDMA wherein the AP can directly send multiple data to multiple stations (supported by specific indications inside the PLCP header), a trigger mechanism has been adopted for the AP to trigger uplink communications from various nodes.

To support an uplink multi-user transmission (during a pre-empted TxOP), the 802.11ax AP has to provide signalling information for both legacy stations (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 4:
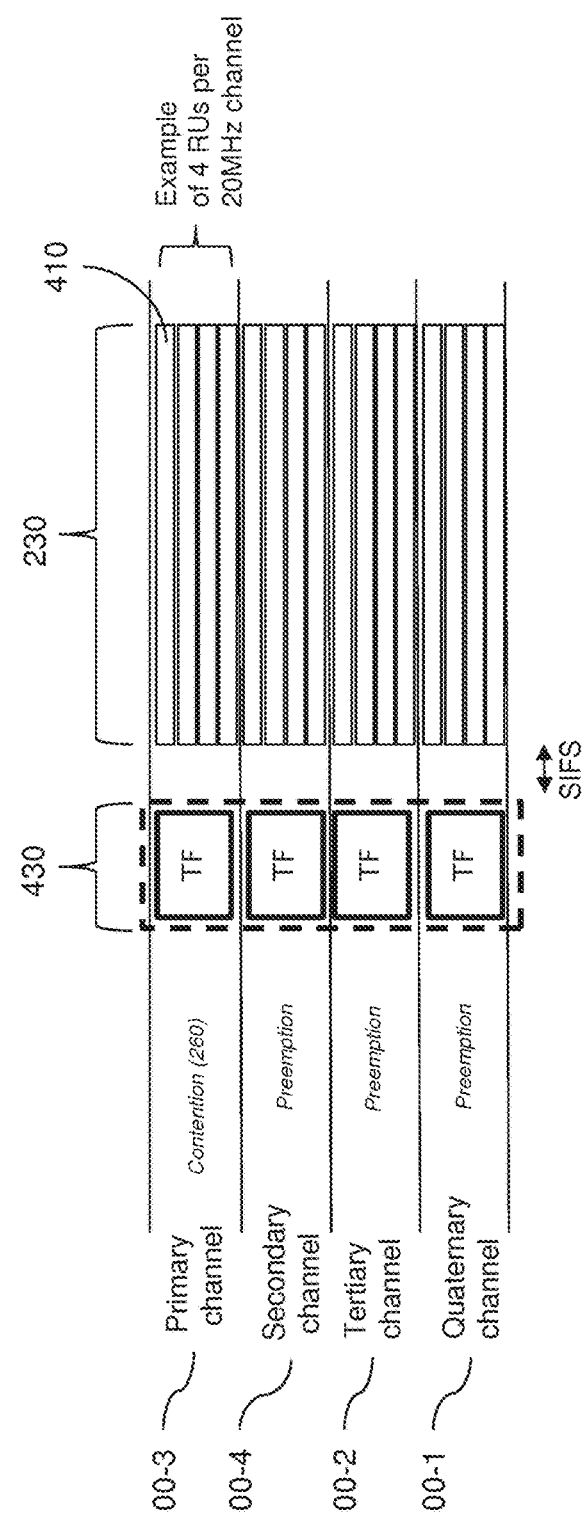
FIG. 4 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 4, the AP sends a trigger frame (TF) 430 to the targeted 802.11ax nodes. The bandwidth or width of the targeted composite channel is signalled in the TF frame, meaning that the 20, 40, 80 or 160 MHz value is added. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF on its primary channel, then sets its NAV to the value specified in the TF frame in order. This prevents these legacy nodes from accessing the channels of the targeted composite channel during the TXOP.

Figure 5:
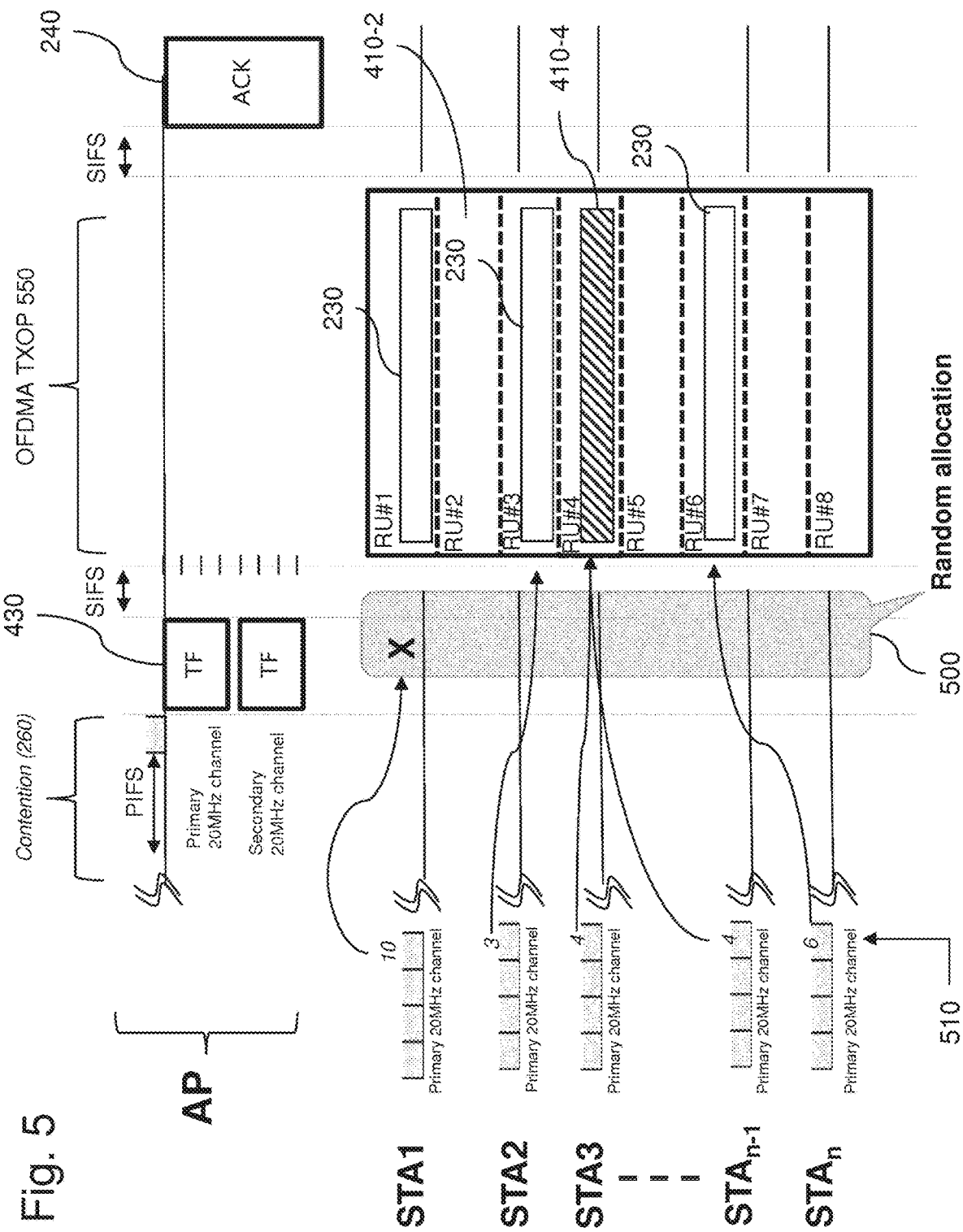
FIG. 5 illustrates exemplary communication lines according to an exemplary random allocation.

The trigger frame TF may designate at least one resource unit (RU) 410, or "Random RU", which can be randomly accessed by more than one node. In other words, Random RUs designated or allocated by the AP in the TF may serve as basis for contention between nodes willing to access the communication medium for sending data. An exemplary embodiment of such random allocation is illustrated by FIG. 5.

The trigger frame TF may also designate Scheduled resource units, in addition or in replacement of the Random RUs. Scheduled RUs may be reserved for certain nodes in which case no contention for accessing such RUs is needed.

In this context, the TF includes information specifying the type (Scheduled or Random) of the RUs. For instance, a tag may be used to indicate that all the RUs defined in the TF are Scheduled (tag=1) or Random (tag=0). In case, Random RUs and Scheduled RUs are mixed within the TF, a bitmap (or any other equivalent information) may be used to define the type of each RU (the bitmap may follow a known order of the RUs throughout the communication channels).

The multi-user feature of OFDMA allows the AP to assign different RUs to different nodes in order to increase competition. This may help to reduce contention and collisions inside 802.11 networks.

In the example of FIG. 4, each 20 MHz channel is sub-divided in frequency domain in four sub-channels or RUs 410, typically of size 5 Mhz. These sub-channels (or resource units) are also referred to as "sub-carriers" or "traffic channels".

Of course the number of RUs splitting a 20 MHz may be different from four. For instance, between two to nine RUs may be provided (thus each having a size between 10 MHz and about 2.2 MHz).

As shown in the Figure, all the RUs 410 have the same time length 230 (corresponding to the length of the TXOP).

FIG. 5 illustrates exemplary communication lines according to an exemplary random allocation procedure 500 that may be used by the nodes to access the Random RUs indicated in the TF. This random allocation procedure is based on the reuse of the backoff counter values of the nodes for assigning an RU to a node of the network to send data.

An AP sends a trigger frame TF defining RUs with random access. In the example of the Figure, eight RUs with the same bandwidth are defined for a 40 MHz composite channel, and the TF 430 is duplicated on the two 20 MHz channels forming the composite channel. In other words, the network is configured to handle four OFDMA Resource Units per each 20 MHz channel.

Each node STA1 to STAn is a transmitting node with regards to receiving AP, and as a consequence, each node has at least one active backoff value (corresponding to the AC backoff counter having the lowest value).

The random allocation procedure comprises, for a node of a plurality of nodes having an active backoff 510, a first step of determining from the trigger frame the sub-channels or RUs of the communication medium available for contention, a second step of verifying if the value of the active backoff local to the considered node is not greater than the number of detected-as-available RUs, and then a step of sending data is performed on the RU whom number equals the backoff value.

In other words, the Random RUs may be indexed in the TF, and each node uses the RUs having an index equal to the backoff value of the node.

As shown in the Figure, some Resource Units may not be used, for instance RUs indexed 2 (410-2), 5, 7 and 8. This is due to the randomization process, and in the present example, due to the fact that none of the nodes has a backoff value equal to 2, 5, 7 or 8 when the TF is sent.

FIG. 5a illustrates an example of use of eight RUs forming the composite channel (of course the number of OFDMA RUs may vary). The eight RUs have a similar design, i.e. the same time length (corresponding to the TXOP duration) and the same frequency width.

The AP sends a TF with the duration 550 for instance 3 ms and a number of Random RUs and/or Scheduled RUs.

Upon receiving the TF, the nodes access the Scheduled RUs or contend for access (e.g. as described above with reference to FIG. 5) to the Random RUs, and then transmit their data in the accessed RU or RUs during a time corresponding to the TXOP duration 900.

In this example, the data traffics sent by the nodes are heterogeneous, i.e. video, voice, web application, control frames, etc. are mixed within the same UpLink (UL) MultiUser (MU) OFDMA transmission.

As shown in the Figure, the resulting PPDUs are very different one from the other in term of duration.

This is because the amount of data to be transmitted greatly varies from one data type to the other.

This is also because, even for the same type of data traffic or for the same quantity of data to transmit, the modulation used by the nodes (the modulation is linked to the distance between the transmitting node and the Access Point) substantially modifies the transmission duration. According to the modulation used (MCS0 to 9 in IEEE802.11ac), the number of bit carried by each OFDM symbol changes, and for a given quantity of data, the transmission duration changes also knowing that the symbol duration is fixed.

For instance, node STA1 may transmit web browsing traffic (AC_BE: access category best effort), node STA2 may transmit a control frame, and node STA4 may transmit a large aggregation of video data frames (AC_VI: access category Video).

As shown in the Figure, the PPDU sent by STA4 (553) use the full TXOP duration of the UL MU OFDMA while the PPDU send by STA1 (551) requires padding (552) to maintain a signal on the RU #1 for the entire TXOP duration. Indeed, if the data transmission lasts less than the TXOP duration 550, the nodes have to pad up (send padding data) up to the end of the UL MU transmission.

This example of FIG. 5a illustrates the drawbacks of the UL MU transmission in some scenarios.

The so-called "small packets" as the one sent by STAT suffer from important overhead, due to the important amount of padding required to have a signal up to the end of TXOP 230. There is a need to mitigate this situation and to improve efficiency of the Trigger Frame mechanism when small packets are transmitted.

Also, due to the heterogeneity of the different PPDUs transmitted by the nodes, a huge quantity of padding data is sent over the RUs. There is a need to adapt the Trigger Frame mechanism to the heterogeneity of data between the RUs.

All of these needs seek to improve usage of the network, in particular by reducing the padding.

Embodiments of the present invention find a particular application in enhancements of the 802.11ac standard, and more precisely in the context of 802.11ax wherein dense wireless environments are more ascertained to suffer from previous limitations.

Embodiments of the present invention provide improved wireless communications with more efficient use of bandwidth while limiting the risks of collision. In particular, it is sought to reduce the amount of padding data.

An exemplary wireless network is an IEEE 802.11ac network (and upper versions). However, the invention applies to any wireless network comprising an access point AP 110 and a plurality of nodes 101-107 transmitting data to the AP through a multi-user transmission. The invention is especially suitable for data transmission in an IEEE 802.11ax network (and future versions) requiring better use of bandwidth.

An exemplary management of multi-user transmission in such a network has been described above with reference to FIGS. 1 to 5.

First main embodiments of the present invention provide that, in addition to reserving at least one communication channel of the wireless network for a transmission opportunity and defining a plurality of resource units forming the communication channel, the trigger frame includes an indicator restricting data to be sent on at least one of the resource units to data having a restricted type of data.

As a consequence, the nodes may determine, from the trigger frame, an indicator defining a restricted type of data authorized for at least one of the resource units; determine, from local transmitting memory, data having a type corresponding to the determined restricted type of data; and transmit the determined data to the access point on the said resource unit.

By using such indicator, the AP may force the nodes to send specific data that are particularly adapted to the design of the RUs.

Two main approaches are proposed for the first embodiments.

Figure 9:
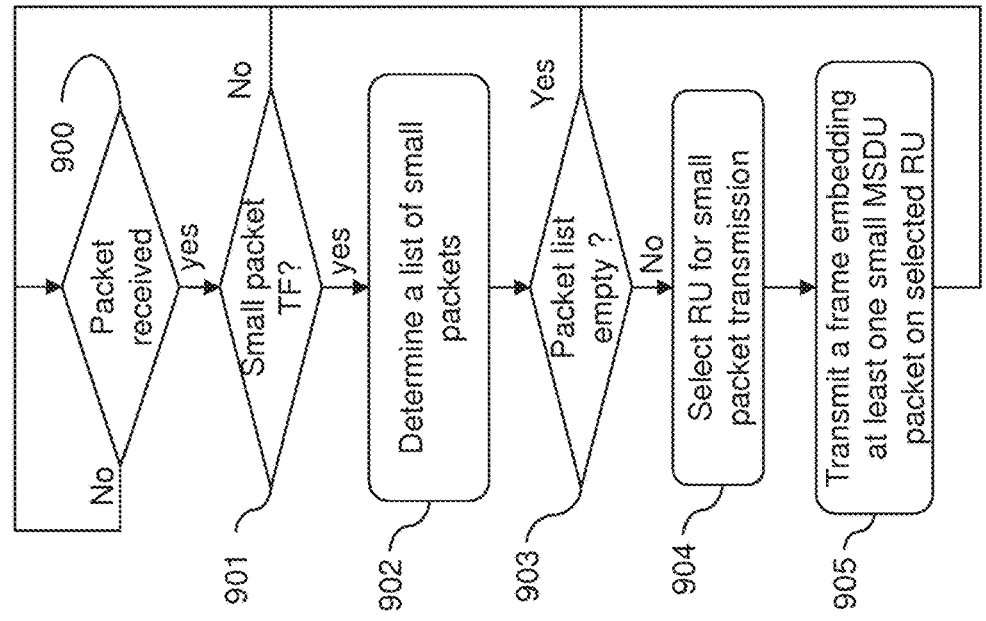
FIG. 9 illustrates, using a flowchart, general steps of the first embodiments of the present invention, from a node's perspective.
Figure 8:
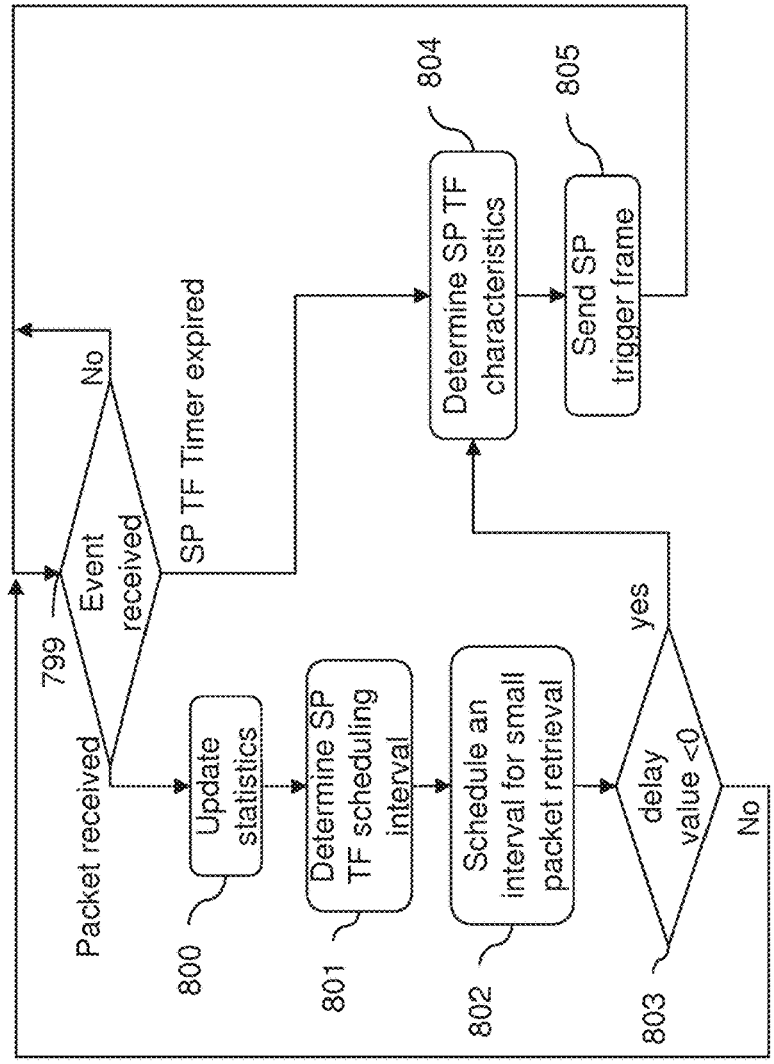
FIG. 8 illustrates, using a flowchart, general steps of first embodiments of the present invention, from an access point's perspective.

On one hand, the restricted type of data defines small MAC packets relative to the MAC packets conveyed over the wireless network. This approach, described with more details below with reference to FIGS. 8 and 9, is for the AP to control the transmission of so-called small packets, by sending appropriate trigger frames. Thus, depending on the amount of small packets in on-going communications (the AP is able to classify the data conveyed over on-going communications), the AP may decide to clean node's transmitting buffer with small packets, in order to reduce overall contention time for the nodes and overall overhead due to the small packets.

On the other hand, the restricted type of data defines a traffic type of data. Main embodiments refer, for the restricted traffic type of data, to one of the four access categories defined in the 802.11 standard, namely AC_BK for background data, AC_BE for best-effort data, AC_VI for video applications and AC_VO for voice applications. This approach is described with more details below with reference to FIGS. 10 and 11. As a consequence, the AP may force the nodes to use RUs with specific traffic data, because it may consider the RUs forming the composite channel are well designed for such specific type of data. Again, efficiently using the RUs makes that less padding data is sent. This improves usage of the network bandwidth.

Other main embodiments of the invention provide that, in a trigger frame reserving at least one communication channel of the wireless network for a transmission opportunity and defining a plurality of resource units forming the communication channel, the plurality of resource units having the same time length, resource units within the communication channel are defined with different frequency widths.

The RUs provided in a composite channel are thus more adapted to heterogeneous data traffic. By selecting the RU to be used in an appropriate way (examples of selection procedure are described below), the nodes generally reduce the amount of padding sent. Usage of the network bandwidth is thus improved.

For instance, the node may determine whether or not one of the resource units matches an amount of data to be sent in the priority AC transmitting queue of the node, and in case of positive determining, transmitting the data of the priority AC transmitting queue on the matching resource unit.

The approach of these other main embodiments is described below with reference to FIGS. 12 to 14.

The main approaches of the first main embodiments and the approaches of the other main embodiments may be partly or entirely combined in order to add their benefits in reducing the overall padding.

Figure 6:
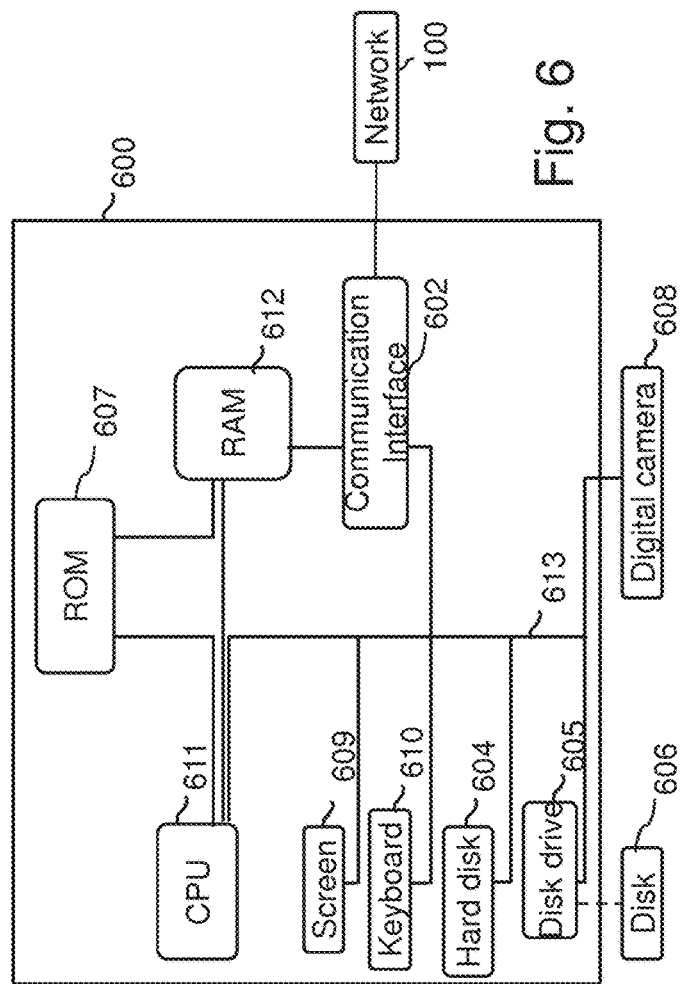
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a microcomputer, a workstation or a light portable device. The communication device 600 comprises a communication bus 613 to which there are preferably connected:

a central processing unit 611, such as a microprocessor, denoted CPU;

a read only memory 607, denoted ROM, for storing computer programs for implementing the invention;

a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames or control frames are transmitted, for example a wireless communication network according to the 802.11ac protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:
- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
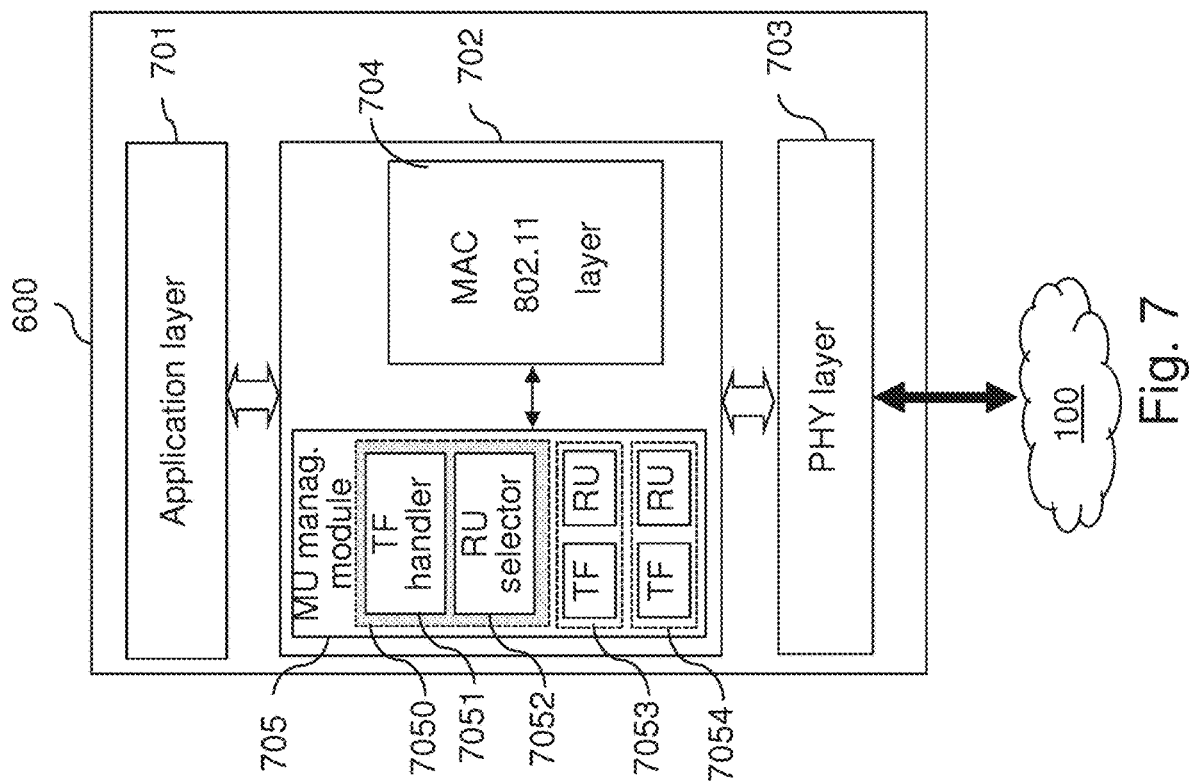
FIG. 7 shows a schematic representation of a wireless communication device in accordance with embodiments of the present invention.

FIG. 7 is a block diagram schematically illustrating the architecture of a communication device or node 600, either the AP 110 or one of nodes 100-107, adapted to carry out, at least partially, the invention. As illustrated, node 600 comprises a physical (PHY) layer block 703, a MAC layer block 702, and an application layer block 701.

The PHY layer block 703 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 430 to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The PHY layer block 703 includes CCA capability to sense the idle or busy state of 20 Mhz channels and to report the result to the MAC 702 according to 802.11 standard. Upon detecting a signal with significant received signal strength, an indication of channel use is generated.

The MAC layer block or controller 702 preferably comprises a MAC 802.11 layer 704 implementing conventional 802.11ax MAC operations, and an additional block 705 for carrying out, at least partially, the invention. The MAC layer block 702 may optionally be implemented in software, which software is loaded into RAM 612 and executed by CPU 611.

Preferably, the additional block 705, referred to as the MU management module, implements the parts dedicated to implement all or part of the embodiments of the invention that regards node 600.

For instance, when implementing the first approach of the first main embodiments of the invention, an illustrating example of which being described below with reference to FIGS. 8 and 9, MU management module 705 includes a small packet (SP) management module 7050, including a "TF Handler" sub-block 7051 for the AP to implement the algorithm of FIG. 8 and/or a "RU selector" sub-block 7052 for each node to implement the algorithm of FIG. 9.

When implementing the second approach of the first main embodiments of the invention, an illustrating example of which being described below with reference to FIGS. 10 and 11, MU management module 705 includes an access category (AC—or traffic type) management module 7052, which also includes a "TF Handler" sub-block for the AP to implement one of the algorithms of FIG. 10 and/or a "RU selector" sub-block for each node to implement the algorithm of FIG. 11.

When implementing the other main embodiments of the invention, an illustrating example of which being described below with reference to FIGS. 12 to 14, MU management module 705 includes a frequency width management module 7053, which also includes a "TF Handler" sub-block for the AP to implement the algorithm of FIG. 12 and/or a "RU selector" sub-block for each node to implement the algorithm of FIG. 14.

The exemplary node of FIG. 7 includes the features according to all the embodiments of the invention as described below with reference to FIGS. 8 to 15.

On top of the Figure, application layer block 701 runs an application that generates and receives data packets, for example data packets of a video stream. Application layer block 701 represents all the stack layers above MAC layer according to ISO standardization.

FIGS. 8 and 9 illustrate, using two flowcharts, general steps of embodiments of the present invention which restrict data to be sent on at least one of the resource units to data having a restricted type of data, in particular to small MAC packets relative to the MAC packets conveyed over the wireless network. FIG. 8 is a flowchart from the Access Point's perspective, while FIG. 9 is a flowchart from the node's perspective. They apply to multi-user OFDMA uplink in an 802.11ax wireless medium.

Small packets may be defined in various ways.

First, small MAC packets may be MAC packets having a packet size lower than a predetermined maximum small packet size (i.e. threshold). For instance, the predefined maximum packet size equals a so-called RTS Threshold parameter set for the wireless network according to the 802.11 standard. Typically, a value equal to 256 bit can be selected. The threshold size may be set in advance in the AP by the administrator or by default factory settings.

In a variant, the small packets may be defined relative to their overhead cost. For instance, small MAC packets may be MAC packets having an overhead due to a MAC header in the packets that is higher than a predetermined maximum overhead (i.e. threshold). A typical ratio value is 20% or 30%.

In a third embodiment, the threshold value (either the predetermined maximum small packet size or the predetermined maximum overhead) can be dynamically determined using a learning mechanism as described below with reference to step 804.

FIG. 8 illustrates an exemplary process for the AP to generate a Trigger Frame dedicated to collection of small packets (SP), also referred below to as SP Trigger Frame or SP TF.

Such a SP trigger frame is built in order to force the nodes to send only small packets in specific RUs (preferably all the RUs or all the Random RUs defined by the SP TF). To achieve that, the SP TF includes an indicator specifying such restriction to small packets.

Various implementations may be contemplated.

For instance, the restricting indicator specified in the SP TF may be a predetermined maximum small packet size or maximum overhead providing an upper bound when evaluating whether packets are small packets or not. Such information may be provided using a dedicated field 1522 in the signaling shown in FIG. 15.

In variant, such upper bound may be predefined and known by all the AP and nodes of the network. In such a case, there is only a need to indicate that the TF is SP TF either for all the RUs or for some RUs.

In embodiments, the restricting indicator defines a trigger frame type, namely the SP TF. It indicates that all the RUs defined by the SP TF are restricted to small packets. In other words, the trigger frame includes a single indicator that define the same restricted type of data for all the resource units of the at least one communication channel.

In other embodiments, the restriction may be defined at the RU level. That means that an indicator defined an RU traffic type: either restricted to small packets, or not restricted. It means that the trigger frame includes one indicator per resource unit, thus defining various restricted types of data for various respective resource units. For instance, a dedicated RU SP or traffic type field may be used in the RU description as described below with reference to FIG. 15, to limit the usage of specific RUs to the transmission of small packets.

In a variant to the use of a specific restricting indicator in the SP TF, embodiments may provide that the duration of the TXOP is voluntarily made very short in order to implicitly allow only small packets to be transmitted. To achieve this configuration, the AP shall determine a duration of the transmission opportunity based on a predefined resource unit frequency width and a predetermined maximum small packet size, so that the at least one resource unit can only include MAC packets having a packet size lower than the predetermined maximum small packet size. Preferably, the predefined maximum small packet size equals the so-called RTS Threshold parameter set for the wireless network according to the 802.11 standard, and the predefined resource unit width is a minimal frequency width authorized by the 802.11 standard (2.2 MHz when a 20 MHz channel is split into nine RUs).

As described below, a scheduling of the SP TF sending is determined in order to optimize the reduction of the small packet overhead. This includes determining a frequency of sending a trigger frame having a restricted type indicator, based on network statistics on one or more previous transmission opportunities. It corresponds to the first steps 800-803 of the process now described.

The process starts at step 799 where the AP determines if a new event occurs. If a new event occurs, step 799 determines whether the new event corresponds to the reception of a packet at MAC level, or corresponds to the expiration of a SP TF timer as explained below, or corresponds to any other event.

When a packet is received at MAC level, next step 800 is executed during which the AP (in a more general manner, any node in the network may initiate a TXOP by sending a TF, in which case FIG. 8 may be implemented by such a node) gathers some statistics about the wireless network during one or more previous TXOPs.

Exemplary statistics include the number of nodes in the network, the number or ratio of collisions (collided RUs), the number or ratio of used RUs, the number or ratio of unused RUs, a distribution of the packet size received by the AP, etc.

The statistics may be updated each time a new MAC packet is received and decoded by the AP.

Next, at step 801, the AP determines a maximum waiting time between two successive SP trigger frame transmissions.

The determination is based on the updated statistics, and may be performed using pre-computed abacus of the optimal waiting time between two successive SP TFs. To be more precise, the abacus may draw an optimal waiting time as a function of the number of nodes in the network and/or as a function of a collision rate (number of collided RUs out of the total number of RUs during the last N TXOP).

Note that different abacus may be used for different AP profiles: for instance one abacus for an AP acting as a hot spot, one for an AP acting as a home set top box, one for an AP acting as an enterprise AP, etc. This is to better match with network conditions.

In a variant, the time interval between two successive SP TFs may be determined using a learning mechanism. For instance, the AP has received small packets from some nodes during the previous TXOPs.

The ratio of used RUs and the number of small packets received as determined during step 800 may be used to change the scheduling interval. For instance, if a given threshold of RUs is used (typically 80%), the AP may reduce the interval between two SP TFs by dividing a current time interval by a ratio, typically by two. On the contrary, a small usage ratio of the RUs (less than 50%) may drive to increase the interval between two SP TFs by multiplying the current time interval by a ratio, typically by 2.

While two mechanisms (abacus usage and learning mechanism) are suggested above, any other mechanism may be used to adapt the scheduling of the SP TF sending.

Next to step 801 having determined the maximum waiting time, step 802 consists for the AP to schedule the next time instant at which the next SP TF should be emitted. Thus, the AP adapts the delay until the next SP TF must be sent, based on the sending time of the previous SP TF and the maximum waiting time determined at step 801.

Steps 801 and 802 thus define a SP TF timer before sending a new SP TF.

Once, the next sending time instant is known, step 803 consists for the AP to determine when the delay/timer ends. If the delay has just expired, a SP TF has to be sent and step 804 is executed. Otherwise, the SP TF timer value is modified or adjusted according to the delay determined at step 802 (if no timer is running, for instance during the activation phase, a new timer is initiated with the waiting value), and the system returns in the waiting step 799, waiting for a new packet reception.

When the SP TF timer has expired as detected either through test 803 or test 799, step 804 is executed.

At step 804, the AP determines the characteristics of the SP TF: for instance the number of RUs, and which ones are Scheduled RUs and which ones are Random RUs; the number of RUs allocated to small packets, and which ones from all the RUs; the TXOP duration; the maximum size or overhead defining the small packets for the current SP TF.

For instance, the AP may adjust the predetermined maximum small packet size or maximum overhead from one trigger frame to the other, based on network statistics on one or more previous transmission opportunities. This information (maximum size or overhead) may be specified within the AP for the nodes to know the upper limit of the small packets.

Also, the AP may determine the number of resource units forming the communication channel, based on network statistics on one or more previous transmission opportunities. Again, this is to optimize usage of the network bandwidth given the nodes' needs.

In a first embodiment, the number of resource units, the predetermined maximum small packet size or maximum overhead and the TXOP duration are fixed and known by all the nodes. Step 804 only retrieves these values. For instance, a maximum small packet size is set, typically to 256 bytes; the number of RUs dedicated to small packets is equal to the total number of possible RUs (typically 9 RU per 20 MHz channel) in the composite channel (typically 40 Mhz composite channel will contain 18 RU); and the TXOP duration is set to fit the predefined maximum small packet size given the number of RUs.

In a more complex second embodiment, step 804 uses predefined abacus to obtain a value for those TF characteristics.

For instance, the number of RUs dedicated to small packets may be set according to a predefined abacus (typically linking the number of SP RUs to the number of nodes in the cell depending on the AP type: hot spot, home, enterprise, etc.).

A similar mechanism may be used to determine the maximum small packet size.

Again, the TXOP duration may be set to fit the abacus-based maximum small packet size given the abacus-based number of RUs.

The abacus may be determined using simulation models or real measurement during evaluation tests of the access point implementing the invention.

In a third embodiment, a learning mechanism is used during step 804 to determine the TF characteristics.

For instance, the number of RUs dedicated to small packets may be determined as a function of the ratio of used RUs during the last TXOP dedicated to small packets. The ratios of used RUs, collided RUs and/or unused RUs are gathered at step 800. Based on such rations, a typical algorithm may be performed at step 804 to determine the number of small packet RUs: if the ratio of used RUs is more than 80%, the maximum number of SP RUs is doubled; if the ratio is less than 50%, the maximum number of SP RUs is divided by two; otherwise, the maximum number of SP RUs is unchanged.

Note that the number of RUs per 20 MHz should not exceed a maximum number of RUs, typically nine RUs per 20 MHz channel. Such value (9 RUs per channel) may be used by the AP as a default value when starting the wireless network cell.

Of course, combinations of these embodiments may be contemplated within the scope of the present first embodiments: for instance, a fixed maximum small packet size and a number of SP RUs determined dynamically.

Next to step 804, step 805 creates and sends the SP trigger frame having the characteristics determined at step 804. This SP TF sending causes one or more nodes of the network to transmit their pending small packets in Random RUs during the SP TXOP. Step 805 also launches a new SP TF timer initiated with the current waiting interval value.

FIG. 9 illustrates an exemplary process for the node to process Trigger Frames, in particular TF dedicated to collection of small packets (SP).

At step 900, the node waits until a MAC packet addressed to it is received.

Upon receiving such MAC packet, the process goes to step 811 in which the node determines whether or not the received packet is a SP trigger frame.

Figure 15:
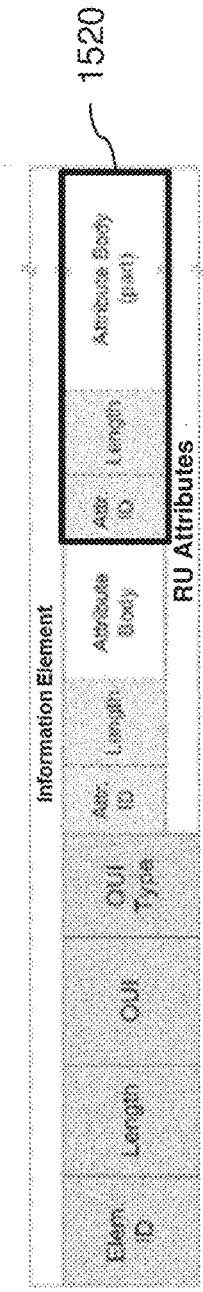
FIG. 15 presents an exemplary format for signalling RU attributes according to the first, second and third embodiments of the present invention.

To do so, the node checks, at step 901, whether or not at least one RU defined by the TF is dedicated to small packets, by reading the appropriate restricting indicator in the TF (for instance the RU traffic type field 1521—see FIG. 15).

If it is not, the received MAC packet is processed according to conventional mechanisms, and the process loops back to step 900. In particular, in case the AP has sent a trigger frame with no indication of small packet collection but with a very short TXOP to force the nodes to only send small packets, the node performs a conventional processing, meaning that it will looks for appropriate (small packet) data in its transmitting buffer queues.

If the received packet is a SP TF, step 902 is executed during which the node determines whether or not it has some small packets to transmit.

To do so, the node first determines the maximum small packet size or overhead ratio. Depending on how the SP TF characteristics are defined as described above with reference to step 804, this maximum small packet size or overhead ratio can be known in advance (fixed parameter), or transmitted in the SP TF (through field 1522 of each RU for instance—see FIG. 15).

As conventionally known, 802.11 nodes usually have a plurality of ordered transmitting queues (or Wi-Fi Multimedia (WMM) waiting queues). The queues are usually associated with traffic classes or access categories as mentioned above. Each WMM waiting queue is associated with a dynamic priority value which is usually an AC backoff counter.

During step 902, the node builds a list of small packets (SP list) to be sent.

In a first embodiment, only the first (according to a transmission order in the queue) small packet from the WMM transmitting queue having the highest priority value (i.e. with the smallest backoff counter), given the maximum small packet size or overhead, is considered. So, a single small packet is added to the list and thus sent by the node during the current SP TXOP.

In a second embodiment, the first small packet from each WMM transmitting queue, given the maximum small packet size or overhead, is considered. So, a maximum of four small packets (in case of the four 802.11 WMM queues) is added to the list and thus sent during the current SP TXOP.

In a third embodiment, all the small packets from all the WMM transmitting queues, given the maximum small packet size or overhead, are considered.

In a fourth embodiment, in addition to the four existing 802.11 WMM queues, the node may maintain a fifth transmitting queue in which it queues only small packets (given the maximum small packet size or overhead) as they are generated from transmission. In this embodiment, all the packets of the fifth transmitting queue storing only small packets are considered.

Once the SP list has been built, step 903 determines whether the SP list is empty or not (i.e. are there one or more small packets to transmit?).

If the SP list is not empty, step 904 is executed. Otherwise, the process loops back to step 900.

At step 904, the node selects one or several RUs to transmit all or part of the small packets of the SP list.

In a first embodiment, only one RU is selected, for instance one Random RU among the SP RUs using the random allocation procedure 500 of FIG. 5.

In a second embodiment, if the SP list contains a plurality of packets, a plurality of RUs may be selected (e.g. a Random RU), for instance one RU per packet of the SP list. However, several packets per RU can also be contemplated.

For illustrative purposes only, one RU per packet may be selected for the first and second embodiments described at step 902. In this configuration, the TXOP duration is preferably short so that the SP RUs are designed to fit more or less the maximum small packet size. This reduces the amount of padding.

Still for illustrative purposes, a number of RUs allowing the transmission of all the small packets of the SP list (in one or several RUs if needed) may be selected for the third and fourth embodiments described at step 902.

If a plurality of RUs is to be selected, a random allocation procedure is applied, for instance the procedure 500 described above with reference to FIG. 5 is applied iteratively to select all the required RUs.

Next to step 904, the node transmits the small packets of the SP list in the selected RU or RUs, at step 905.

In the first and second embodiments described above at step 902, each small packet of the SP list may be sent on a different RU.

In the third and fourth embodiments described above at step 902, the small packets are for instance aggregated (or concatenated) to fill in the selected RU or RUs, according to the TXOP duration. When small packets are aggregated, the TXOP duration may be of conventional time length because several small packets are sent within a single RU. The aggregation thus helps reducing the amount of padding.

Next to step 905, the process loops back to step 900.

Turning now to FIGS. 10 and 11, they illustrate, using two flowcharts, general steps of embodiments of the present invention which restrict data to be sent on at least one of the resource units to data having a restricted type of data, in particular to a specific traffic type of data. Traffic types of data generally refers to the four access categories defined in the 802.11 standard, namely AC_BK for background data, AC_BE for best-effort data, AC_VI for video applications and AC_VO for voice applications. FIGS. 10a and 10b are alternative flowcharts from the Access Point's perspective, while FIG. 11 is a flowchart from the node's perspective. They apply to multi-user OFDMA uplink in an 802.11ax wireless medium.

FIG. 10a illustrates an exemplary process for the AP to generate a Trigger Frame causing transmission of some traffic types (TT) by the nodes, also referred below to as TT Trigger Frame or TT TF. In this exemplary process, the sending of the TT trigger frame is driven by the number of reserved RUs (test 1003 below).

During the initialization of the AP, the number of RUs to be allocated during an OFDMA transmission is predetermined at step 1000. This number can be fixed or dynamically updated. Various frequency widths may be contemplated for the RUs within the same composite channel, as described below with reference to the embodiments of FIGS. 12 to 14.

Once the number of RUs is known, step 1001 consists for the node in gathering some statistics about the wireless network during one or more previous TXOPs. As described below, these statistics will be used to define the traffic policy through which each RU to be reserved is associated with a traffic type.

Several events and statistics can be tracked by the AP, for instance:

a collision ratio (of colliding RUs). Such ratio corresponds to a percentage of bandwidth loss due to collisions among the nodes of the 802.11 network cell.

When there are many collisions, many nodes contend for access the wireless medium at the same time. As a consequence, bandwidth sharing driven by the AP can make the wireless access more fluent. So, for instance, when the collision ratio is greater than a predetermined threshold, one or several TT trigger frame can be sent;

statistics regarding traffic types (for instance the four 802.11 access categories). An example of statistics is the part of each traffic type among the overall amount of data sent by the nodes. It corresponds to network statistics on the amount of data received in one or more previous transmission opportunities for each of the predefined traffic types. Note that It is for the AP to assign a RU traffic type to each RU of the TT trigger frame based on the part of each traffic type in the overall traffic. A trigger frame profile may thus be generated and adapted, later on, as the network traffic evolves (due to evolving traffic requirements such as the latency of each data traffic);

a queue size associated with each traffic type representing the sum of all corresponding traffic waiting to be sent by all the nodes.

As known in the 802.11 standard, the MAC header of the send packet includes a "Queue Size" field indicating the amount of buffered traffic for a given traffic type that is waiting in the transmitting node. Based on such information, the AP is able to compute global statistics on total queue size for each of the predefined traffic types, a total queue size for a predefined traffic type summing the sizes of transmission queues that are associated, in the nodes, with the predefined traffic type. The AP may then build an associated TT trigger frame defining RUs with dedicated traffic types.

Next to step 1001, step 1002 uses the statistics to dedicate one or more RUs to respective specific RU traffic types.

When all the RUs of a trigger frame have been reserved for dedicated traffic types (in a variant when a predetermined number of RUs have been reserved for dedicated traffic types) (test 1003), the trigger frame is built and broadcasted to all the nodes (1004 and 1005).

FIG. 10b is a variant to FIG. 10a when the trigger frame is periodically sent. In FIG. 10b, the sending of the TT trigger frame is no longer driven by the number of reserved RUs (test 1003 below), but by the traffic policy and mainly by the latency of traffics.

Based on statistics (including latency associated with each of the four 802.11 standard access categories [voice, video, best effort, background] that have different requirements about latency—step 1011), the AP may determine at step 1012 a time interval before sending the next TT Trigger Frame, also depending on which traffic types will be associated with the RUs of the TT Trigger Frame. As the most critical access category is the video access category, the time interval will be shorter for such a TT Trigger Frame including Video Access RUs than for a TT Trigger Frame including RUs only of the other access categories.

In a second sub-process, the AP waits for the end of the determined time interval (test 1013), and then prepare the TT Trigger Frame (step 1004) before sending it (step 1005).

FIG. 11 illustrates an exemplary process for the node to process Trigger Frames, in particular TT Trigger Frame sent by an AP according to FIG. 10a or 10b.

Upon receiving a TT trigger frame, i.e. a trigger frame defining one or more RUs associated with restricting traffic types (test 1100), the node checks whether it is a TT Trigger Frame indicating a single restricting traffic type or not (test 1101).

If only one restricting traffic type is defined in the TT Trigger Frame, the node selects the corresponding access category WMM queue (step 1120).

Next, it checks (step 1121) whether or not there is at least one packet ready to be sent in the selected AC WMM queue. In such a way, the node selects data in a transmitting queue storing data having only the determined restricted type of data.

If there is one or more packets in the selected AS WMM queue, the node selects (step 1122) one (or more) RU having the restricting traffic type, for instance by using the procedure 500 of FIG. 5 to select one Random RUs associated with the restricted traffic type.

Next, the node transmits MPDU frames with the packets of the selected AS WMM queue, in the selected RU or RUs (step 1123) and waits for a corresponding acknowledgment from the AP indicating a successful transmission (step 1124).

If two or more restricting traffic types are defined in the TT Trigger Frame (mixed traffic type), the node successively considers the transmitting queue according to an highest-to-lowest priority value order, until data is sent on a resource unit; and for each transmitting queue successively considered, it determines whether a resource unit in the communication channel has the restricted traffic type, and in case of positive determination, transmits data from the transmitting queue currently considered on the determined resource unit.

As shown in the Figure, the node first selects the access category having the (next) highest priority, i.e. the access category having the current smallest backoff value (step 1110).

Next, the node parses the list of RUs as defined in the received TT Trigger Frame in order to select an RU having the same traffic type as the (next) highest priority (step 1111).

If a single RU having the (next) highest priority traffic type is detected, it is selected (step 1122).

In case several RUs have the appropriate traffic type, a random allocation procedure as procedure 500 of FIG. 5 may be used to select one particular RU (step 1122).

Once an RU has been selected, steps 1123 and 1124 described above are executed to perform data transmission.

If no RU defined in the TT TF has a dedicated traffic type matching the (next) highest priority traffic type, it is determined if a non-processed access category remains (step 1112), in which case the process loops back to step 1110.

Thanks to the restriction of RUs to specific traffic types, the AP may efficiently adapt the TXOP to the various types of traffic.

Figure 12:
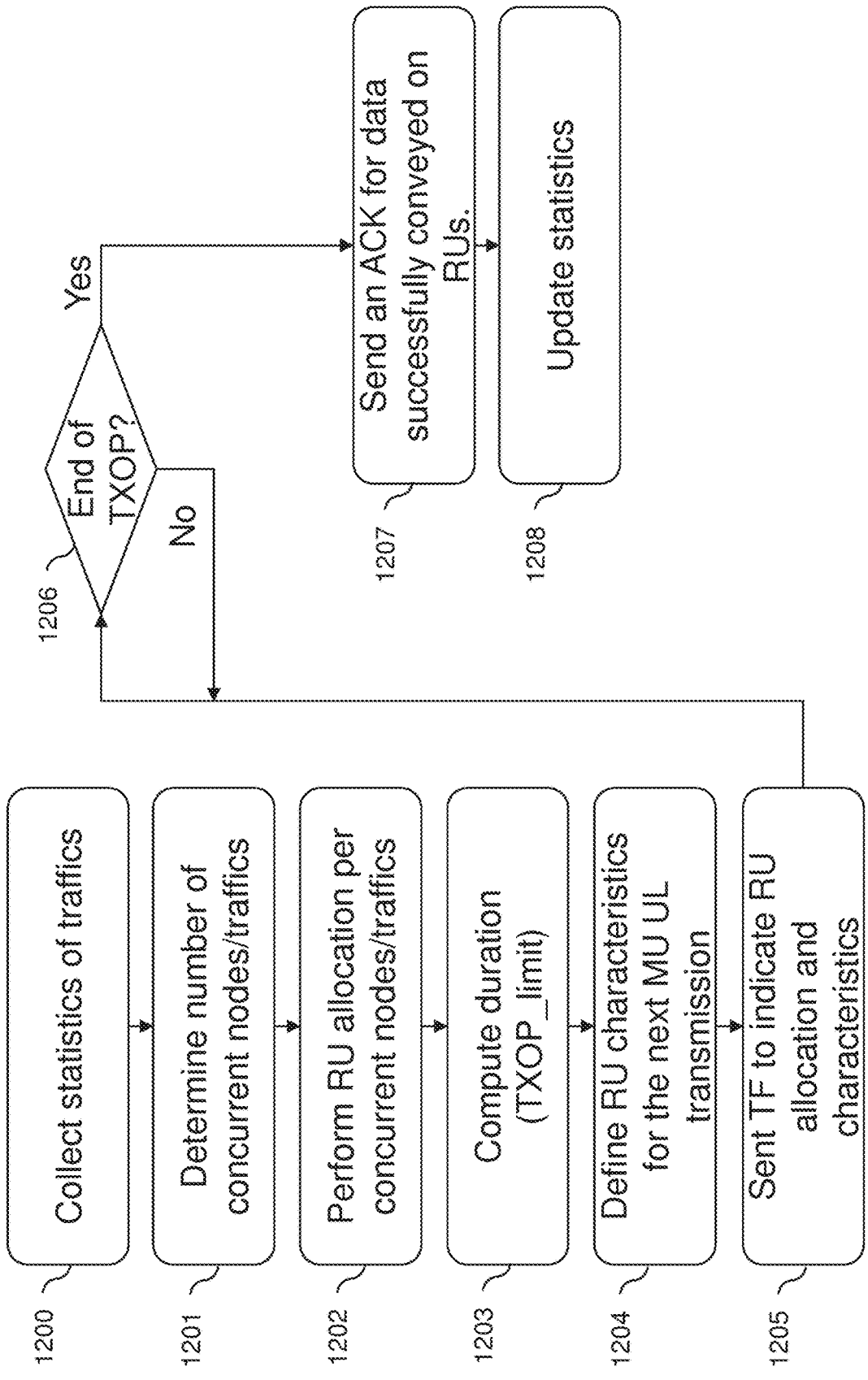
FIG. 12 illustrates, using a flowchart, general steps of third embodiments of the present invention, from an access point's perspective.
Figure 13:
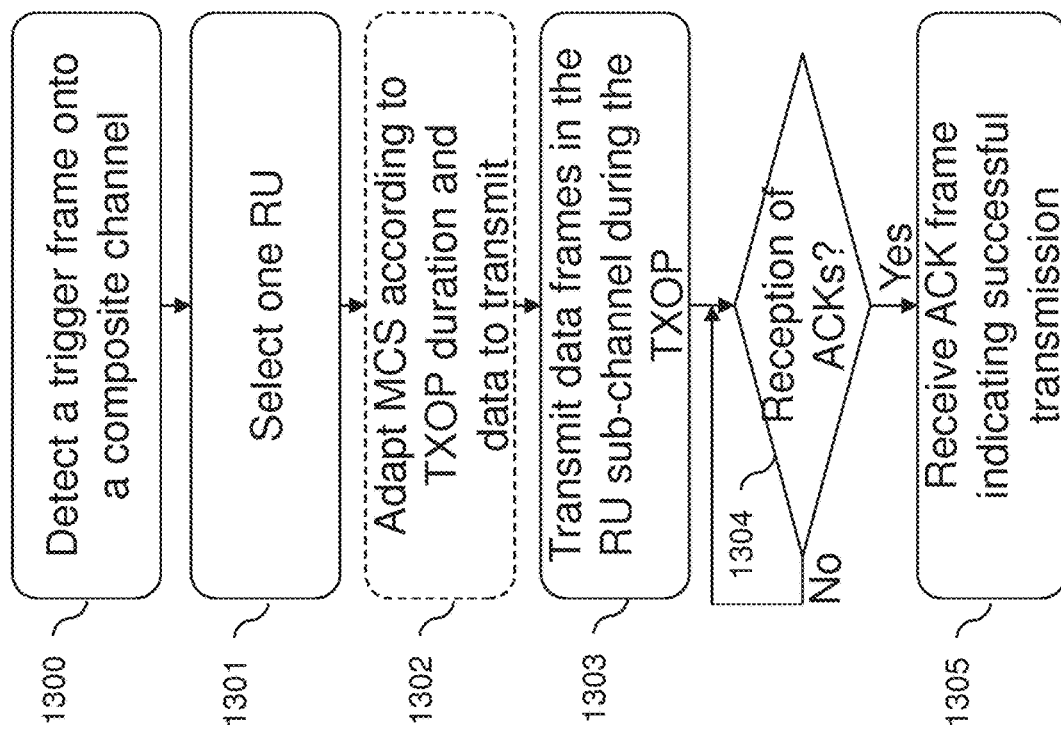
FIG. 13 illustrates, using a flowchart, general steps of the third embodiments of the present invention, from a node's perspective.

Turning now to FIGS. 12 and 13, they illustrate, using two flowcharts, general steps of embodiments of the present invention in which the Trigger Frame define resource units within the communication channel that have different frequency widths, i.e. a different number of tones.

FIG. 12 is a flowchart from the Access Point's perspective, while FIG. 13 is a flowchart from the node's perspective. They apply to multi-user OFDMA uplink in an 802.11ax wireless medium.

FIG. 12 illustrates an exemplary process for the AP to generate a Trigger Frame defining resource units within the communication channel with different RU frequency widths.

The process starts at step 1200 in which the AP gathers statistics on the traffic in the network cell (BSS), for instance statistics regarding each traffic type (for instance the four 802.11 access categories—video, voice, background, best effort). An example of statistics is the part of each traffic type among the overall amount of data sent by the nodes. Other statistics may include the number of registered nodes, the modulation scheme (MCS) used by each node, the modulation scheme (MCS) used on each RU, an identification of steady traffic (video streaming, VoIP . . . ) or random traffic (Web browsing, control frame . . . ), the mean duration of transmission (without padding i.e. the duration for a transmission outside multi-user OFDMA uplink transmission or in a multi-user OFDMA uplink transmission by excluding padding duration).

Next, at the step 1201, the AP determines the number of concurrent (i.e. simultaneous) nodes and/or traffic types.

The number of concurrent nodes/traffics is used by the AP to define the number of RUs to allocate for the MU UL TXOP. For instance, the higher the number of simultaneous nodes/traffics, the higher the number of RUs.

For illustrative purpose, the number of RUs may be set equal to the number of active nodes (i.e. transmitting data) in the N previous TXOPs (possibly TXOPs implementing the present embodiment of FIGS. 12 and 13). This approach is used for instance when each node can only sends data of a single traffic type. It may also apply in the case the nodes are forced to send data of only one traffic type.

In any case, a traffic type is associated to each RU.

Step 1202 thus consists in reserving RUs in the TF for specific nodes or traffics.

Note that the RU allocation of step 1202 should preferably take into account the number of concurrent data traffics within each node, since a corresponding number of RUs should be provided for the specific node, if at all possible. For instance, a node may transmit two separate data traffics through the AP: a video stream may coexist with a VoIP communication in a smartphone.

As a consequence, the number of RUs may be set equal to the number of pairs (traffic type, transmitting node) detected during the N previous TXOPs (possibly TXOPs implementing the present embodiment of FIGS. 12 and 13).

Step 1202 thus defines an optimal number of RUs that should be provided to satisfy the network needs, each RU being dedicated to a respective traffic type. Note that this optimal number of RUs is not necessarily correlated to the real number of available RUs at this stage of the process (it means that the optimal number may be higher than the number of possible RUs in the composite channel).

Next, steps 1203 and 1204 are executed in relation with each other and may be looped to avoid inconsistency to define the duration of the TXOP or the number of RUs and corresponding frequency widths first, and the other in relation to the information first defined.

At step 1203, the AP computes the duration of the next MU UL transmission, i.e. the next TXOP triggered by the trigger frame to be sent.

To do so, the AP determines which types of data traffic are currently conveyed in the network (based on statistics on previous N TXOPs for instance or on the traffic types associated with the RUs determined at step 1202) and more especially the repartition of data traffic, for instance according to the four 802.11 ACs, in order to adjust the TXOP duration accordingly.

More generally, the duration may be determined according to the average duration of N (integer) previous transmissions in order to minimizing the padding on average.

In a variant, the duration may also be determined to give priority to some traffic. For instance, if a lot of best effort traffic is conveyed in the RUs during one or more previous TXOPs, a short TXOP duration may be chosen, for instance by taking the time allowing the transmission of the typical quantity of data of the best effort access category (according the statistics obtained in 1200). On the contrary, if several video streams are on-going, a larger TXOP duration may be chosen, preferably close to the TXOP limit defined for the video access category.

Without any statistic, the TXOP duration may be set to of the TXOP limit duration of the video access category (AC_VI) and accordingly one RU with a 106 tones width is allocated for video—AC_VI (or traffic with large quantity of data to transmit), one RU with a 52 tones width is allocated for VoIP—AC_VO (or traffic with intermediate quantity of data to transmit) and three RUs with 26 tones each, are allocated for respectively Best effort, Background access category (AC_BE, AC_BK) and control packet in a 20 MHz channel, i.e. one RU per each traffic type on the 20 MHz band.

Once the TXOP duration has been determined, the AP defines, at step 1204, the RU characteristics for the next TXOP.

This includes the number of RUs. Furthermore, as the TXOP duration is set, the other main RU characteristic to be determined is the frequency width (number of tones) for each RU forming the TF.

According to the TXOP duration and the quantity of data to transmit for each traffic type (list of the optimal RU allocation and associated quantity of data), the AP determines the frequency width of each RU (for each traffic type) in term of tones (the quantity of data to transmit being a function of the TXOP duration and of the RU_width_in_tones).

Next, the AP decides how to allocate the tones available on the composite channel to various RUs, in order to define the TF. This takes into account the RU_width_in_tones for each traffic type.

For instance, four RU_width_in_tones may be defined for a channel of 20 MHz (26 tones, 52 tones, 106 tones and 242 tones).

For a 20 MHz channel in OFDMA MU Uplink, the maximum number of RUs with respect to the definition of the RU_width_in_tones may be defined as follow: nine RUs of 26 tones each; or four RUs of 52 tones each plus one RU of 26 tones; or two RUs of 106 tones each plus one RU of 26 tones; or one RU of 242 tones. These are exemplary RU profiles among a wide set of possible RU profiles. The only limitation to mix the different RU_width_in_tones is the maximum number of tones for a channel (e.g. for 20 MHz, 242 tones).

Back to the previous RU profile example, the AP may allocate for instance three RUs of 26 tones plus one RU of 52 tones plus one RU of 106 tones in a channel of 20 MHz.

If the number of required RUs defined at step 1202 as the optimal number of RUs is higher than the capability of the composite channel given the RU_width_in_tones for each traffic type, a prioritization is performed. It can be made based on the traffic categories, to give priority to steady streams, small packets, or to minimize as much as possible padding by excluding the RU or RUs for which the actual transmission duration of useful data (by taking into account the modification of duration applied by the number of tones allocated) is very different from the TXOP duration defined in the previous step. These RUs are those for which too few data are scheduled for transmission.

After, the allocation and the definition of the RU characteristics, the TXOP duration can be refined (if necessary) to adjust the transmission duration with the effective RU slots.

The RU frequency width is preferably determined based on the traffic type to which it is dedicated as determined at step 1202 based on statistics. That is the frequency width of the resource units is determined based on statistics on data related to each traffic type as received in one or more previous transmission opportunities. Note that the RUs may be explicitly assigned to a specific traffic type in the TF, using the mechanisms described above with reference to FIGS. 10 and 11.

However, the specific traffic type may not be signalled in the TF. This is because, by designing the RUs with appropriate sizes, the nodes will select data that fit well the available bandwidth of the RUs, i.e. the intended content (traffic type) is implicitly designated. For instance, RUs with large frequency width are implicitly dedicated for large contents such as video.

An example of RU frequency widths is the following: the AP allocates 4 times more tones to a video RU_traffic_type than to a background RU_traffic_type and 2 times more tones to a voice RU_traffic_type than to a background RU_traffic_type in order to keep the differentiation brought by the TXOP Limit parameter of the 802.11n standard. In other words, the resource unit or units associated with AC_BK and AC_BE traffic type have a first frequency width (for instance the minimal frequency width authorized by the 802.11 standard, i.e. 2.03 MHz when the 20 MHz channel is split into nine RUs), the resource unit or units associated with AC_VO have a frequency width equal to twice the first frequency width and the resource unit or units associated with AC_VI have a frequency width equal to four times the first frequency width.

Due to the 1/4 ratio of the frequency width between AC_BK RUs and AC_VO RUs, the TXOP duration is preferably set less or equal to a quarter of the TXOP Limit parameter set for the wireless network according to the 802.11 standard.

For illustrative purposes, the 802.11n standard defines a TXOP Limit of 3.008 ms for the video access category (AC_VI), 1.504 ms for the voice access category (AC_VO)

and 0 ms (i.e. 1 MPDU) for the background and best effort access categories (resp. AC_BK and AC_BE). When implementing the present embodiment, the AC_BK and AC_BE may be defined with the minimum number of tones (e.g. 26 tones), the AC_VO with twice more tones, i.e. 52 tones and the AC_VI with four times more tones, i.e. 106 tones. For this configuration the duration of the MU UL transmission, thus defining the TXOP duration, is set to 752 µs (3.008 ms/4).

Furthermore, the frequency width (number of tones) for an RU may also depend on the modulation scheme, MCS (which also impact the transmission duration) used by the node to reach the AP (an MCS may be defined by each node, but also per RU in each node). In other words, the frequency width of a resource unit associated with a traffic type is adjusted based on a modulation scheme used by the nodes to send data having the associated traffic type in one or more previous transmission opportunities.

On the other hand, the AP may also set the MCS to use in order to minimize padding and to maximize BER.

Once all the RU characteristics are known, the TF can be generated and sent on the network at step 1205. A signalling of some RU characteristics in the TF is further described below with reference to FIG. 15.

Note that, for Random RUs, the TF should signal at least the TXOP duration, the number of Random RUs and the frequency width (RU_width_in_tones) for each Random RU. If an RU is explicitly dedicated to a specific traffic type, it is signalled in the TF using a RU_traffic_type field. The latter may be substituted to the RU_width_in_tones if the number of tones is fixed per traffic type.

Next to the TF sending, the AP waits, at step 1206, for the end of the TXOP and sends an acknowledgment (1207), if appropriate, to acknowledge reception of all or part of the MPDUs transmitted from multiple users within the OFDMA TXOP.

Preferably, the ACK frame is transmitted in a non-HT duplicate format in each 20 MHz channel covered by the initial TF's reservation.

Next, at step 1208, the AP updates its statistics according to the current transmission.

FIG. 13 illustrates an exemplary process for the node to process Trigger Frames, in particular the Trigger Frame sent by an AP according to FIG. 12.

At step 1300, the node detects a trigger frame reserving a composite channel. The TF is then decoded in order to analyse its content. The TF defines a plurality of RUs.

At step 1301, the node selects one (or more) of the RUs using the RU characteristics specified in the TF. The selection may also be based on the traffic types it has to transmit.

The node selects any Scheduled RU corresponding to its node_AID and determines the possible traffic_type associated with the Scheduled RU if any. This is to send appropriate data in the RUs.

For Random RUs, the node selects one (or more) Random RU:

either having a signalled traffic type corresponding to a traffic type the node has to transmit (for instance the priority AC queue). This is to drive the node to transmit, on one resource unit, data having the same traffic type as the traffic type associated with the resource unit, or having a frequency width in tones that matches, given the TXOP duration, as much as possible the amount of data it has to transmit (for instance from the priority AC queue). It means that the node determine whether or not one of the resource units matches the amount of data to be sent in the transmitting queue having the highest priority value, and only in case of positive determining, it transmits the data of the transmitting queue having the highest priority value on the matching resource unit.

The node may also use other information from the TF, such as MCS, to adjust its transmission parameter.

Next, at optional step 1302, the node may adapt or adjust a modulation scheme for modulating the data on the resource unit (possibly resource units), the adapting maximizing the time duration of transmitting the data within the transmission opportunity. This step of reducing the MCS seeks to minimize padding in relation to the TXOP duration for the next MU UL transmission. However the same amount of data is transmitted, but with a better BER.

Next, at step 1303, the node transmits the data on the respective one or more RUs selected at step 1201.

At step 1304, the node waits for an acknowledgement from the AP.

When a successful transmission acknowledgment is received, the node flushes the buffered data from the AC transmitting queues at step 1305, ending the process.

Figure 14:
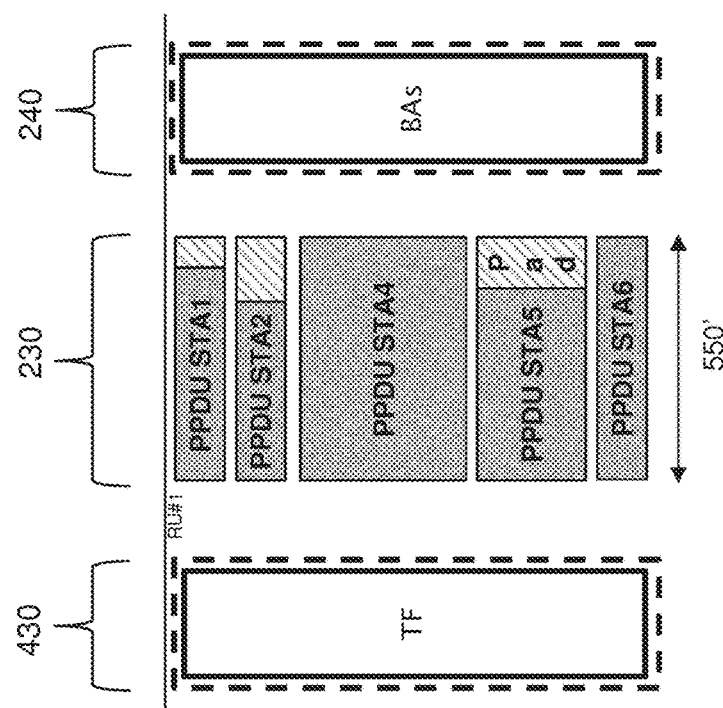
FIG. 14 illustrates an example of designing RUs of a composite channel according to the third embodiments.

FIG. 14 illustrates the benefits of the embodiment of FIGS. 12 and 13, in terms of padding reduction, compared to the situation of FIG. 5a. The benefits rely on choosing different RU profiles according to data traffic and/or node characteristics.

As shown in the Figure, the AP sends a TF with RUs having different frequency widths (in tones number) and having a shorter TXOP duration 550' compared to FIG. 5a. In other words, the AP modifies both dimensions of the RUs (TXOP duration and frequency width in tones) to optimize padding.

In the example of the Figure, the PPDU of node STA4 comprise the same amount of data between FIG. 5a and FIG. 14. However, as the used RU in FIG. 5a is composed of 26 tones and the used RU in FIG. 14 is made of 80 tones, the TXOP duration is substantially reduced, namely divided by about 3 in this example.

On the other hand, the nodes that where sending a lot of padding in FIG. 5a (more than 50% of the MU UL duration) e.g. STA1, STA2, STAG, now sends a substantially reduced amount of padding, thanks to the reduction of the TXOP duration (itself made possible thanks to the various RU frequency widths).

Note that the nodes to which no RU has been allocated (STA3, STA7 and STA8 cannot transmit in this MU UL OFDMA transmission) will transmit in a next MU UL transmission or through a conventional access to the wireless medium (EDCA).

The embodiment of FIGS. 12 and 13 may be applied to both Random RUs and Scheduled RUs.

Random RUs may be used at the creation of the network cell driven by the AP, before Scheduled RUs are used.

Initially, predefined statistics defining a proportion of the different traffic types in a cell and a typical number of nodes in a cell according to the AP characteristics (office, home, stadium . . . ) may be used to define the initial number of Random RUs. TXOP duration and the RU frequency widths may be defined by keeping the scale factor of the 802.11 standard, for instance the AC_BK and AC_BE are defined with 26 tones, the AC_VO with 52 tones and the AC_VI with 106 tones, while the MU UL transmission duration is set to 750 µs.

The initial Random-based phase may be a transitory step used as a learning phase to learn about the traffic type or types sent by each node, the modulation used by each node and/or on each RU, etc. before the Scheduled-based mode is used. In other words, it is a phase during which the node collects or gathers statistics as those mentioned above with reference to step 1200.

During the learning phase, the Random RUs may be dynamically adjusted or refined based on the statistics dynamically gathered. This is to progressively modify the RUs to mirror the real traffic proportions and the number of active registered nodes.

A result of the learning phase is that the width of each RU and the allocation of each RU to a dedicated node can be defined precisely according to current network usage. Preferably, the RU frequency width is chosen based on traffic types, but also based on the modulation scheme because the latter can greatly modify the transmission duration required for a fixed data quantity (for instance modulation MCS 0 provides a bitrate of 6.5 Mbps, while modulation MCS 1 provides a bitrate of 13 Mbps).

Next, the Scheduled RU mode is used where the AP explicitly allocates the designed RUs to specific nodes based on node's needs (for instance transmitted during a previous TXOP; or the AP may use traffic specification, e.g. TSPEC in HCCA, supplied by some nodes to define their need).

FIG. 15 presents the format of a 'RU Information Element' (1510), which may be used to signal small packet attributes of the TF and/or traffic_type attributes of the TF and/or RU frequency width attributes.

The 'RU Information Element' (1510) is used by the AP to embed additional information inside the trigger frame related to the OFDMA TXOP. It format preferably follows the 'Vendor Specific information element' format as defined in the IEEE 802.11-2007 standard.

The 'RU Information Element' (1510) is a container of one or several RU attributes (1520), having each a dedicated attribute ID for identification. The header of RU IE can be standardized (and thus easily identified by the nodes) through the Element ID, OUI, OUI Type values.

The RU attributes 1520 are defined to have a common general format consisting of a one-byte RU Attribute ID field, a two-byte Length field and variable length attribute specific information fields.

The usage of Information Element inside the MAC frame payload is given for illustration only, any other format may be supportable.

The choice of embedding additional information in the MAC payload is advantageous for keeping legacy compliancy with the medium access mechanism, because any modification performed inside the PHY header of the 802.11 frame would have inhibited any successful decoding of the MAC header by legacy devices.

As shown in the Figure, a dedicated RU attribute follows the following format:

The Attribute ID is a dedicated value identifying the 'RU Info'. A value unused in the standard, e.g. in the range 19-221, may be selected. This one-byte value is a tag starting the 'RU Info'.

A two-byte length field defining the length of the attribute body.

The attribute body varies according to the embodiments considered. Attribute body 15*a* refers to the small packet embodiment of FIGS. 8 and 9; attribute body 15*b* refers to the traffic type embodiment of FIGS. 10 and 11; and attribute body 15*c* refers to the varying RU width embodiment of FIGS. 12 and 13.

To efficiently signal the small packet mode (FIGS. 8 and 9), the attribute body 15*a* for a given RU (or for the whole TF) may include:

an SP type field 1521 to indicate if the RU (or all the RUs) is restricted to small packets (or if the TF is a SP TF). This field set to the SP type (small packet type) indicates to the receiving node that the RU (or all the RUs) can only be used to send small packets, for instance smaller than a maximum small packet size;

a maximum small packet size field 1522 used by the AP to explicit define a maximum size for the small packets.

To efficiently signal the traffic type mode (FIGS. 10 and 11), the attribute body 15*b* may include:

a TF_type field 1523 to indicate if the Trigger Frame specifies the mixed mode of step 1101 or not (i.e. specifies a list of RUs with the same traffic type or a list of RU with different mixed traffic types);

an RU_nb field 1524 to define the number of Resource Units composing the composite channel. This number also gives the number of entries in the next field;

an RU_list field 1525 listing the characteristics of each RU of the current OFDMA TXOP. Each entry in the list 1525 may include the following set of field:

an RU_index field to specify the index of the current RU in the RU list;

an RU_type field to specify the Random or Scheduled mode of the RU (only in case of mixed mode);

an RU_traffic_type field to specify the traffic type supported by the RU; and an optional Node_AID field to define the identifier of a node in case of a Scheduled RU. This could be the MAC address, or the Association Identifier (AID), or the Partial AID of a node.

To efficiently signal the RU frequency widths (FIGS. 12 and 13), the attribute body 15*c* for a given RU may include:

an RU_nb field 1524 to define the number of Resource Units composing the composite channel. This number also gives the number of entries in the next field;

an RU_list field 1525 listing the characteristics of each RU of the current OFDMA TXOP. Each entry in the list 1525 may include the following set of field:

an RU_index field to specify the index of the current RU in the RU list;

an RU_width_in_tones field to specify the number of tones for this RU;

an RU_type field to specify the Random or Scheduled mode of the RU (only in case of mixed mode);

an RU_traffic_type field to specify the traffic type supported by the RU;

an optional MCS field to specify the modulation scheme to use for the RU; and an optional Node_AID field to define the identifier of a node in case of a Scheduled RU. This could be the MAC address, or the Association Identifier (AID), or the Partial AID of a node.

All or part of the various attribute bodies described above may be combined to define for instance an SP Trigger Frame which is also a TT Trigger Frame with RUs having varying frequency widths.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method performed in a wireless network comprising an access point, the wireless communication method comprising:
   reserving, at the access point, at least one wireless communication channel to be used by designated nodes in the wireless network;
   sending a trigger frame to the designated nodes, the trigger frame notifying the designated nodes of a splitting of the reserved at least one wireless communication channel in a frequency domain into a plurality of resource units which are available for use by the designated nodes,
   wherein the trigger frame includes an indicator for each of one or more of the plurality of resource units, each indicator being associated with a respective resource unit and each indicator indicating a traffic type of data selected from the four access categories defined in the 802.11 standard.

2. The wireless communication method of claim 1, wherein the selected traffic type of data indicated by the each indicator for its respective resource unit is one of the following: AC_BK for background data, AC_BE for best-effort data, AC_VI for video applications or AC_VO for voice applications.

3. The wireless communication method of claim 1, further comprising determining a frequency of sending a trigger frame including an indicator indicating a traffic type of data, based on network statistics on one or more previous transmission opportunities.

4. The wireless communication method of claim 3, wherein the network statistics include one or more of the following:
   a number of nodes registered to the access point in the wireless network,
   a number of collisions or a collision ratio occurring during the one or more previous transmission opportunities,
   a distribution of packet sizes received by the access point, in particular a packet size distribution relative to a maximum packet size,
   an amount of data transmitted by a plurality of nodes of the wireless network,
   an amount of data transmitted by the plurality of nodes of the wireless network for each traffic type from among a plurality of predefined traffic types, and
   a ratio of medium busyness.

5. The wireless communication method of claim 1, further comprising determining the number of resource units resulting from the splitting of the reserved at least one wireless communication channel in a frequency domain, based on network statistics on one or more previous transmission opportunities.

6. The wireless communication method of claim 1, wherein the trigger frame defines various selected traffic types of data for various respective resource units.

7. A non-transitory computer-readable medium storing a program which, when executed by a microprocessor or computer system in a device of a wireless network, causes the device to perform the wireless communication method of claim 1.

8. A wireless communication method performed in a wireless network comprising an access point, the wireless communication method comprising, at a node of a plurality of designated nodes in the wireless network:
   receiving a trigger frame from the access point, the trigger frame notifying of a splitting of a reserved at least one wireless communication channel in a frequency domain into a plurality of resource units which are available for use by the node, the plurality of resource units also available for use by at least one other node of the designated nodes,
   wherein the trigger frame includes an indicator for each of one or more of the plurality of resource units, each indicator being associated with a respective resource unit and each indicator indicating a traffic type of data selected from the four access categories defined in the 802.11 standard;
   determining, from the trigger frame, an indicator associated with a resource unit of the plurality of resource units, the indicator indicating a traffic type of data selected from the four access categories defined in the 802.11 standard;
   determining, from local transmitting memory, data having a traffic type corresponding to the determined indicated traffic type of data; and
   transmitting the determined data to the access point on the associated resource unit.

9. The wireless communication method of claim 8, wherein the determining, from local transmitting memory, data having a traffic type corresponding to the determined indicated traffic type of data includes selecting data in a transmitting queue storing data having the determined restricted indicated traffic type.

10. The wireless communication method of claim 8, wherein the local transmitting memory of the node includes a plurality of transmitting queues, each being associated with a dynamic priority value and with a traffic type, and the wireless communication method further comprises:
    successively considering the transmitting queue according to an highest-to-lowest priority value order, until data is sent on a resource unit, and
    for each transmitting queue successively considered, determining whether a resource unit in the wireless communication channel has an associated selected traffic type that corresponds to the traffic type of the transmitting queue currently being considered, and in case of positive determination, transmitting data from the transmitting queue currently being considered on the determined resource unit.

11. A communication device acting as an access point in a wireless network, the communication device comprising at least one microprocessor configured for carrying out the steps of:
    reserving at least one wireless communication channel to be used by designated nodes in the wireless network;
    sending a trigger frame to the multiple designated nodes, the trigger frame notifying the designated nodes of a splitting of the reserved at least one wireless communication channel in a frequency domain into a plurality of resource units which are available for use by the designated nodes,
    wherein the trigger frame includes an indicator for each of one or more of the plurality of resource units, each indicator being associated with a respective resource unit and each indicator indicating a traffic type of data selected from the four access categories defined in the 802.11 standard.

12. A communication device in a wireless network comprising an access point, the communication device being one of a plurality of designated nodes in the wireless network, and the communication device comprising at least one microprocessor configured for carrying out the steps of:
receiving a trigger frame from the access point, the trigger frame notifying of a splitting of a reserved at least one wireless communication channel in a frequency domain into a plurality of resource units which are available for use by the node, the plurality of resource units also available for use by at least one other node of the designated nodes,
wherein the trigger frame includes an indicator for each of one or more of the plurality of resource units, each indicator being associated with a respective resource unit and each indicator indicating a traffic type of data selected from the four access categories defined in the 802.11 standard;
determining, from the trigger frame, an indicator associated with a resource unit of the plurality of resource units, the indicator indicating a traffic type of data selected from the four access categories defined in the 802.11 standard;
determining, from local transmitting memory, data having a traffic type corresponding to the determined indicated traffic type of data; and
transmitting the determined data to the access point on the resource unit.

* * * * *